US007076641B2

(12) United States Patent
Fujiwara et al.

(10) Patent No.: US 7,076,641 B2
(45) Date of Patent: Jul. 11, 2006

(54) PROGRAMMABLE CONTROLLER

(75) Inventors: Kotaro Fujiwara, Tokyo (JP); Yuuichi Tachi, Tokyo (JP); Kazuaki Miyabe, Tokyo (JP); Tamiki Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/203,407

(22) PCT Filed: Nov. 21, 2001

(86) PCT No.: PCT/JP01/10179

§ 371 (c)(1),
(2), (4) Date: Aug. 9, 2002

(87) PCT Pub. No.: WO02/084421

PCT Pub. Date: Oct. 24, 2002

(65) Prior Publication Data

US 2004/0024935 A1 Feb. 5, 2004

(30) Foreign Application Priority Data

Apr. 9, 2001 (JP) .............................. 2001-110063

(51) Int. Cl.
*G06F 9/00* (2006.01)

(52) U.S. Cl. ..................................... 712/244

(58) Field of Classification Search ................ 712/244, 712/245; 711/150
See application file for complete search history.

(56) References Cited

U.S. PATENT DOCUMENTS

| 5,586,337 | A | * | 12/1996 | Kusakabe | ..................... 712/32 |
| 5,724,566 | A | * | 3/1998 | Swoboda et al. | ........... 712/245 |
| 5,889,669 | A | * | 3/1999 | Kagami et al. | ............... 700/17 |
| 6,021,459 | A | * | 2/2000 | Norman et al. | ................. 711/5 |

FOREIGN PATENT DOCUMENTS

| JP | 7-92902 | 4/1995 |
| JP | 9-23307 | 1/1997 |
| JP | 10-198409 | 7/1998 |

* cited by examiner

*Primary Examiner*—Eric Coleman
(74) *Attorney, Agent, or Firm*—Sughrue Mion, PLLC

(57) ABSTRACT

When a decoding circuit (22a) decodes an instruction code stored in a pipeline register (21d), the decoding circuit (22a) decodes the device address. Based on this, it is decided which one of the device information of a RAM (11) and a RAM (12) is to be used. When the area of the RAM (12) has been assigned, the decoding circuit (22a) outputs a signal showing that the number of stop of pipeline processing is 0, unlike the assignment of the RAM (11). Therefore, a pipeline register section (21) does not set the pipeline stop signal to 1. Consequently, the reading of the instruction code from the RAM (11) and the pipeline processing are not interrupted. As a result, it is possible to realize a structure in which execution of a high-speed processing is possible and a compact/low-cost structure in the same hardware.

8 Claims, 15 Drawing Sheets

FIG.4

RAM 11 INSTRUCTION CODE IN SEQUENCE PROGRAM AREA

| Address | Content |
|---|---|
| ADDRESS 2n | LOW-ORDER DATA OF INSTRUCTION CODE OF H/W INSTRUCTION (1) |
| ADDRESS 2n+1 | HIGH-ORDER DATA OF INSTRUCTION CODE OF H/W INSTRUCTION (1) |
| ADDRESS 2n+2 | LOW-ORDER DATA OF INSTRUCTION CODE OF H/W INSTRUCTION (2) |
| ADDRESS 2n+3 | HIGH-ORDER DATA OF INSTRUCTION CODE OF H/W INSTRUCTION (2) |
| ADDRESS 2n+4 | LOW-ORDER DATA OF INSTRUCTION CODE OF S/W INSTRUCTION (1) |
| ADDRESS 2n+5 | HIGH-ORDER DATA OF INSTRUCTION CODE OF S/W INSTRUCTION (1) |

RAM 13 INSTRUCTION EXECUTION /NON-EXECUTION STATE IN LAST SCAN

| Address | Content |
|---|---|
| ADDRESS n | INSTRUCTION EXECUTION/NON-EXECUTION STATE OF H/W INSTRUCTION (1) IN LAST SCAN |
| ADDRESS n+1 | INSTRUCTION EXECUTION/NON-EXECUTION STATE OF H/W INSTRUCTION (2) IN LAST SCAN |
| ADDRESS n+2 | INSTRUCTION EXECUTION/NON-EXECUTION STATE OF S/W INSTRUCTION (1) IN LAST SCAN |

FIG.7

RAM 11 CONTENTS OF SEQUENCE PROGRAM AREA

| | |
|---|---|
| ADDRESS 2n | LOW-ORDER DATA OF INSTRUCTION CODE OF H/W INSTRUCTION (1) |
| ADDRESS 2n+1 | HIGH-ORDER DATA OF INSTRUCTION CODE OF H/W INSTRUCTION (1) |
| ADDRESS 2n+2 | LOW-ORDER DATA OF INSTRUCTION CODE OF H/W INSTRUCTION (2) |
| ADDRESS 2n+3 | HIGH-ORDER DATA OF INSTRUCTION CODE OF H/W INSTRUCTION (2) |
| ADDRESS 2n+4 | LOW-ORDER DATA OF INSTRUCTION CODE OF H/W INSTRUCTION (3) |
| ADDRESS 2n+5 | HIGH-ORDER DATA OF INSTRUCTION CODE OF H/W INSTRUCTION (3) |
| ADDRESS 2n+6 | LOW-ORDER DATA OF INSTRUCTION CODE OF H/W INSTRUCTION (4) |
| ADDRESS 2n+7 | HIGH-ORDER DATA OF INSTRUCTION CODE OF H/W INSTRUCTION (4) |
| ADDRESS 2n+8 | LOW-ORDER DATA OF INSTRUCTION CODE OF H/W INSTRUCTION (5) |
| ADDRESS 2n+9 | HIGH-ORDER DATA OF INSTRUCTION CODE OF H/W INSTRUCTION (5) |

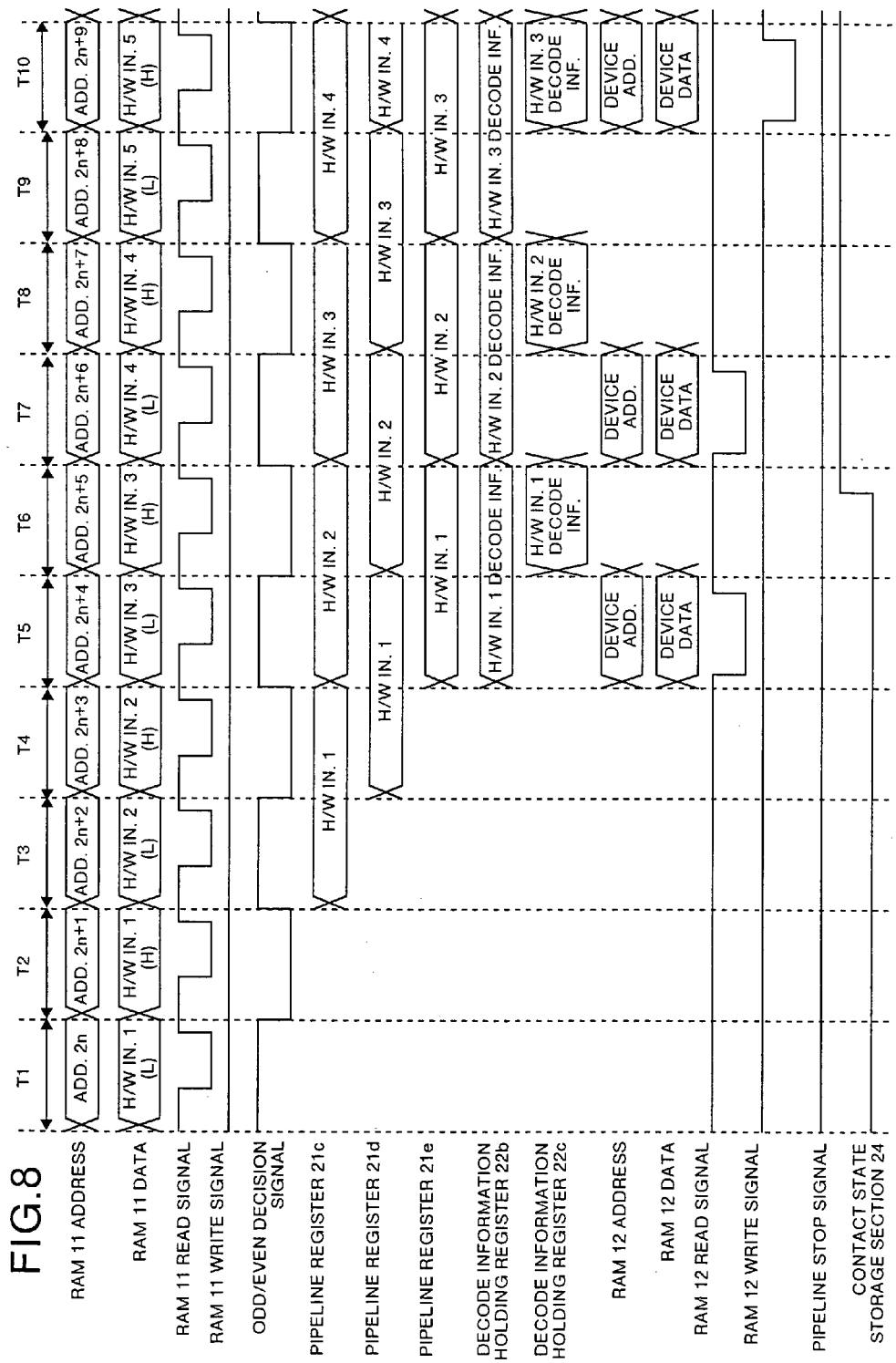

FIG.11

RAM 11 INSTRUCTION CODE IN SEQUENCE PROGRAM AREA

| Address | Content |
|---|---|
| ADDRESS 2n | LOW-ORDER DATA OF INSTRUCTION CODE OF H/W INSTRUCTION (1) |
| ADDRESS 2n+1 | HIGH-ORDER DATA OF INSTRUCTION CODE OF H/W INSTRUCTION (1) |
| ADDRESS 2n+2 | LOW-ORDER DATA OF INSTRUCTION CODE OF H/W INSTRUCTION (2) |
| ADDRESS 2n+3 | HIGH-ORDER DATA OF INSTRUCTION CODE OF H/W INSTRUCTION (2) |
| ADDRESS 2n+4 | LOW-ORDER DATA OF INSTRUCTION CODE OF H/W INSTRUCTION (6) |
| ADDRESS 2n+5 | HIGH-ORDER DATA OF INSTRUCTION CODE OF H/W INSTRUCTION (6) |
| ADDRESS 2n+6 | LOW-ORDER DATA OF INSTRUCTION CODE OF H/W INSTRUCTION (4) |
| ADDRESS 2n+7 | HIGH-ORDER DATA OF INSTRUCTION CODE OF H/W INSTRUCTION (4) |
| ADDRESS 2n+8 | LOW-ORDER DATA OF INSTRUCTION CODE OF H/W INSTRUCTION (5) |
| ADDRESS 2n+9 | HIGH-ORDER DATA OF INSTRUCTION CODE OF H/W INSTRUCTION (5) |

RAM 13 INSTRUCTION EXECUTION /NON-EXECUTION STATE IN LAST SCAN

| Address | Content |
|---|---|
| ADDRESS n | INSTRUCTION EXECUTION/NON-EXECUTION STATE OF H/W INSTRUCTION (1) IN LAST SCAN |
| ADDRESS n+1 | INSTRUCTION EXECUTION/NON-EXECUTION STATE OF H/W INSTRUCTION (2) IN LAST SCAN |
| ADDRESS n+2 | INSTRUCTION EXECUTION/NON-EXECUTION STATE OF H/W INSTRUCTION (6) IN LAST SCAN |
| ADDRESS n+3 | INSTRUCTION EXECUTION/NON-EXECUTION STATE OF H/W INSTRUCTION (4) IN LAST SCAN |
| ADDRESS n+4 | INSTRUCTION EXECUTION/NON-EXECUTION STATE OF H/W INSTRUCTION (5) IN LAST SCAN |

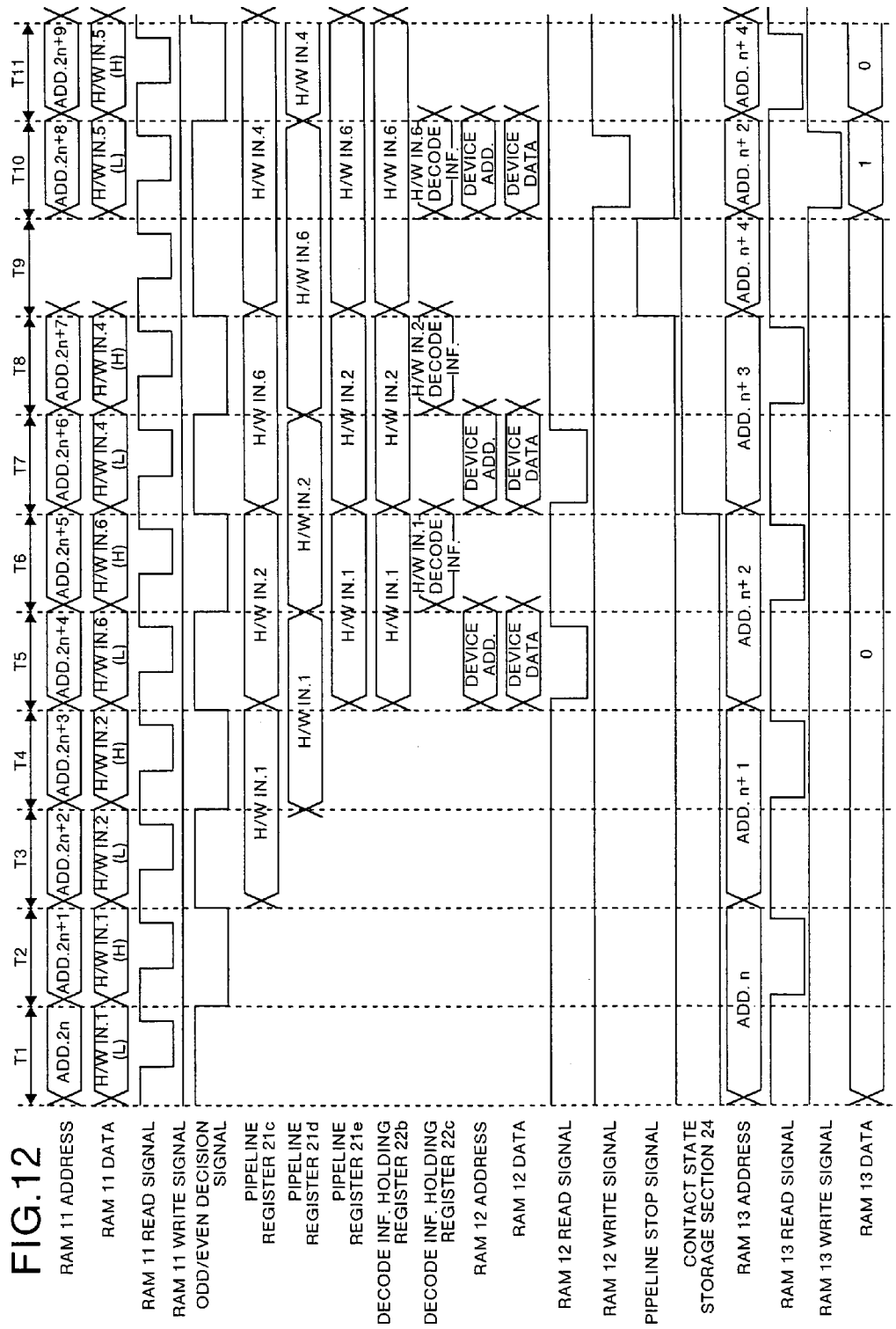

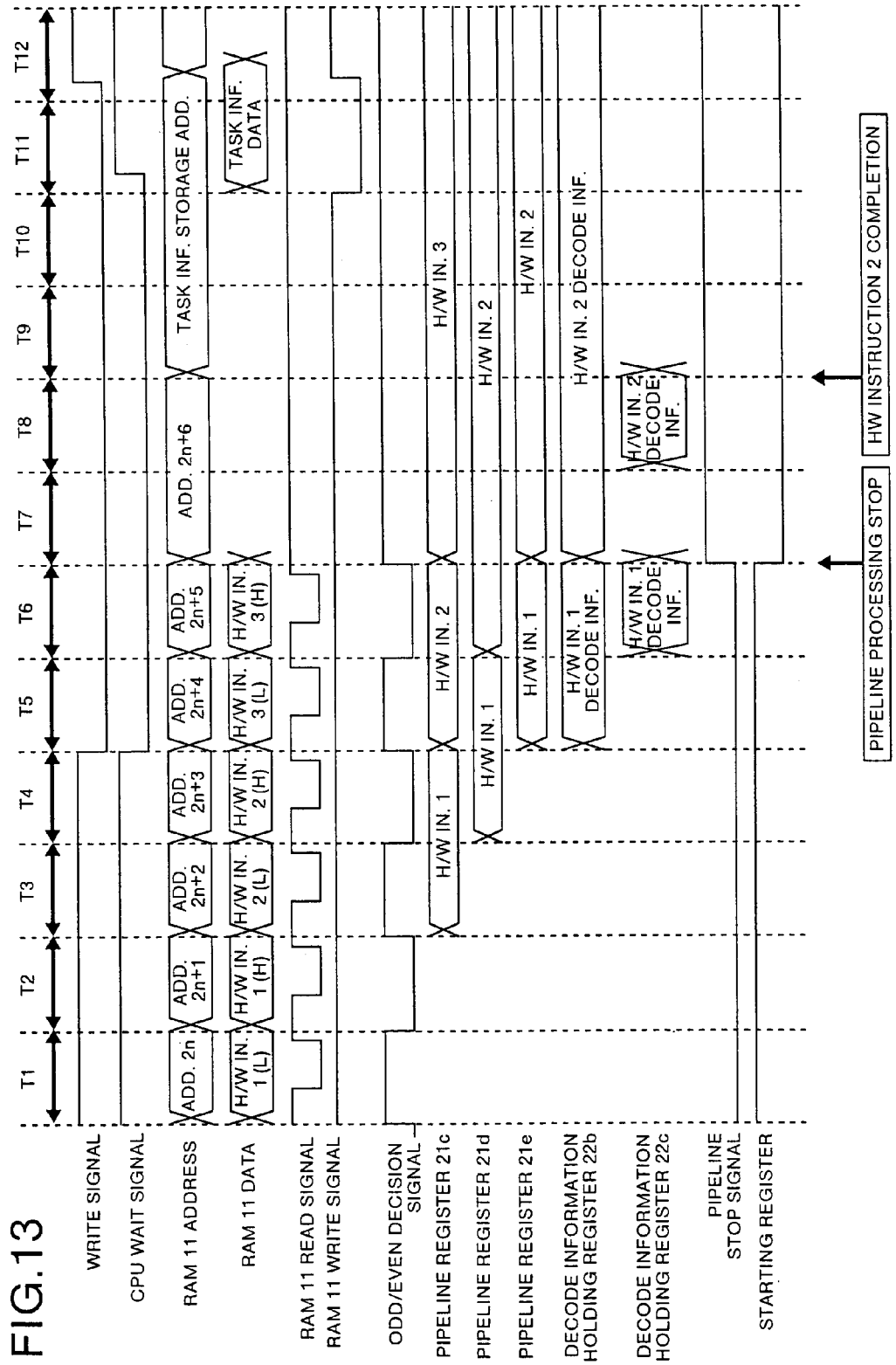

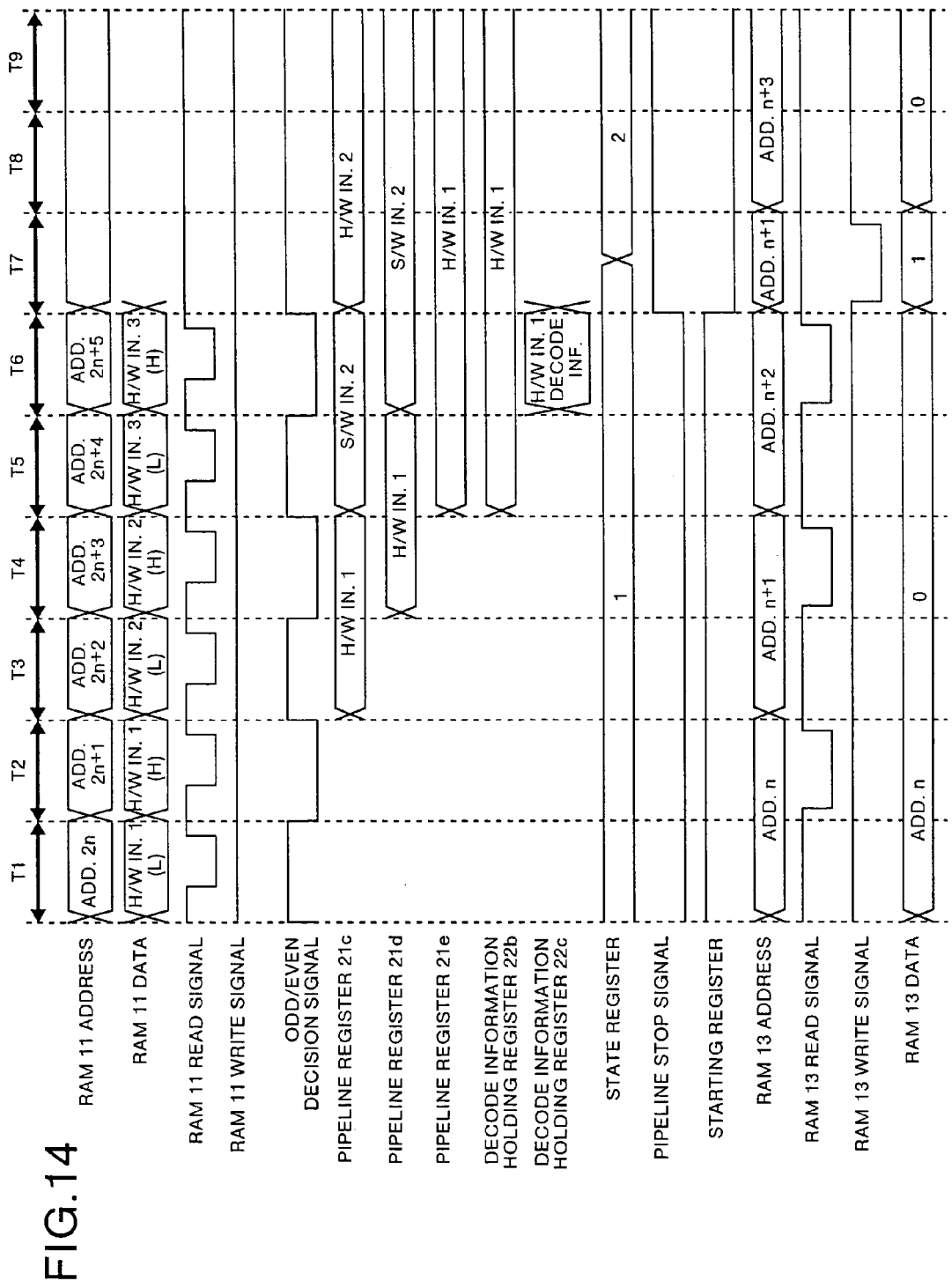

PROGRAMMABLE CONTROLLER

TECHNICAL FIELD

The present invention relates to a programmable controller comprising at least a first storage unit and a second storage unit which store sequence programs, device information used for a sequence processing, and task information of a microprocessor, the second storage unit storing the device information, and a pipeline register that sequentially reads and latches sequence programs from the first storage unit, thereby to carry out a pipeline processing of the sequence programs. More particularly, this invention relates to a programmable controller that can realize a structure in which execution of a high-speed processing is possible and a compact/low-cost structure in the same hardware.

BACKGROUND ART

A programmable controller sequentially reads sequence programs stored in a sequence program storage section like a RAM, and executes a processing according to the read sequence programs. Depending on sequence programs, the programmable controller executes reading/writing of the device information at the time of executing the processing.

FIG. 16 is a block diagram which shows a structure of a conventional general programmable controller. The reference numeral 47 denotes a CPU that carries out a sequence processing according to sequence programs, 49 denotes a RAM that stores sequence programs and device information that is used in the sequence processing, and 48 denotes a ROM in which system information of the CPU is stored.

In the programmable controller shown in this drawing, since the sequence programs and the device information are stored in the same RAM, it is not possible to simultaneously execute the reading of a sequence program and the reading/writing of the device information. Therefore, in order to execute the reading/writing of the device information, it is necessary to interrupt the reading of a sequence program. Thus, there is a problem in that the processing time is elongated. On the other hand, this programmable controller has a simple structure and has a small number of parts. Therefore, there is an advantage that it is possible to realize compact hardware at low cost.

Next, a programmable controller disclosed in Japanese Patent Application Laid-open No. 10-198409 will be explained. According to this prior art, a RAM that stores sequence programs and a RAM that stores device information are separated to have a structure that makes it possible to access both RAMs at the same time. Based on this, a high-speed processing is realized.

FIG. 17 is a block diagram which shows a structure of the above prior-art programmable controller. The reference numeral 50 denotes a CPU that executes a sequence processing according to sequence programs, 52 denotes a sequence program RAM that stores sequence programs, 53 denotes a device RAM that stores input information and output information used in the sequence processing, and 51 denotes a ROM that stores system information of the CPU.

According to this structure, the RAM that stores sequence programs and the RAM that stores device information are separated. Therefore, when the CPU sequentially reads sequence programs, it is possible to simultaneously execute the reading/writing of the device information. Consequently, in executing the processing by reading/writing device information based on the sequence programs, it is possible to execute the parallel processing of the reading of a sequence program and the reading/writing of the device information. As, it is possible to carry out the reading/writing of the device information without interrupting the reading of a sequence program, it is possible to execute a high-speed processing. On the other hand, the number of RAMs becomes larger than that of the above conventional programmable controller, and the number of data buses also becomes large. As a result, there is a problem of increase in cost and increase in sizes of the hardware.

As explained above, there are two types of conventional programmable controllers, that is, (1) one that stores sequence programs and device information in the same RAM, and (2) the other that stores sequence programs and device information in separate RAMs respectively. Both types have advantages and disadvantages. However, neither type can realize a low-cost and compact structure and a structure of high-speed processing in the same hardware. Therefore, when both a low-cost and compact structure and a high-speed processing programmable controller are necessary, two kinds of hardware become necessary.

It is an object of the present invention to provide a programmable controller that can realize two types of structures in the same hardware, that is, a structure that realizes low cost and compactness with a reduced number of RAMs by sharing a RAM that stores sequence programs with a RAM that stores device information, and a structure that realizes a high-speed processing through the execution of a parallel processing of the reading of a sequence program and the reading/writing of the device information by using two RAMs, one RAM that stores sequence programs and the other RAM that stores device information.

DISCLOSURE OF THE INVENTION

The programmable controller according to one aspect of this invention carries out a pipeline processing of sequence programs. The programmable controller comprises at least a first storage unit and a second storage unit, the first storage unit storing the sequence programs, device information used for a sequence processing, task information of a microprocessor, and the second storage unit storing the device information, and a pipeline register that sequentially reads and latches the sequence programs from the first storage unit. The programmable controller also comprises a selecting unit that selects whether the device information is to be read/written from/to the first storage unit or the second storage unit based on the sequence programs, and a control unit that controls to interrupt the pipeline processing during the reading/writing of the device information, prohibits the reading of the sequence program until the completion of the reading/writing of the device information when a sequence program to be read/written from/to the first storage unit has been input, and controls to carry out the reading/writing of the device information and the reading of a sequence program simultaneously when a sequence program to be read/written from/to the second storage unit has been input.

According to the above-mentioned aspect of this invention, whether the device information is to be read/written from/to the first storage unit or the second storage unit is selected based on the sequence programs. When a sequence program to be read/written from/to the first storage unit has been input, a control is carried out such that the pipeline processing is interrupted during the reading/writing of the device information, and the reading of the sequence program is prohibited until the completion of the reading/writing of the device information. When a sequence program to be read/written from/to the second storage unit has been input, the reading/writing of the device information and the reading of a sequence program are carried out at the same time. Therefore, by only changing a device address, it is possible to differentiate the use of two types of structures in the same hardware, that is, a structure in which it is possible to execute the reading of an instruction code and the reading/writing of the device information simultaneously at high speed, and a structure excellent in compactness and low cost in which the number of memories used is reduced based on a shared use of a memory that stores instruction codes and device information.

According to a programmable controller according to another aspect of this invention, in the above invention, the pipeline register is a register that collectively stores data of one sequence program when all of this data has been read from the first storage unit, and the control unit controls not to execute the reading/writing of the device information from/to the first storage unit until when the reading of the data of the one sequence program has been completed.

According to the above-mentioned aspect of this invention, the pipeline register is a register that collectively stores data of one sequence program when all of this data has been read from the first storage unit. A control is carried out such that the reading/writing of the device information from/to the first storage unit is not executed until when the reading of the data of the one sequence program has been completed. Therefore, it is possible to apply the pipeline register to read the data of one sequence program at a plurality of times.

Moreover, the programmable controller further comprises a third storage unit that stores a bit showing execution/non-execution of an instruction in the last scan, together with sequence programs.

According to the above-mentioned aspect of this invention, there is provided a third storage unit that stores a bit showing execution/non-execution of an instruction in the last scan, together with sequence programs. Therefore, it is possible to decide execution/non-execution of an instruction in an instruction decoding section, by utilizing execution/non-execution of an instruction in the last scan.

Furthermore, upon input of an instruction to execute the reading/writing of the device information, the control unit controls to execute the reading/writing of the device information from/to the first storage unit or the second storage unit when an execution condition has been established based on ON/OFF of a contact state of a sequence program immediately before, and controls not to execute the reading/writing of the device information from/to the first storage unit or the second storage unit when an execution condition has not been established.

According to the above-mentioned aspect of this invention, upon input of an instruction to execute the reading/writing of the device information, the reading/writing of the device information from/to the first storage unit or the second storage unit is executed when an execution condition has been established based on ON/OFF of a contact state of a sequence program immediately before. The reading/writing of the device information from/to the first storage unit or the second storage unit is not executed when an execution condition has not been established. Therefore, it is possible to decide execution/non-execution of an instruction in an instruction decoding section, according to the ON/OFF of a contact. During a non-execution time, a processing result is not read/written from/to a memory, thereby to shorten the non-execution processing time.

Moreover, upon input of an instruction to execute the reading/writing of the device information in a scan that a contact state of a sequence program immediately before has changed, the control unit controls to execute the reading/writing of the device information from/to the first storage unit or the second storage unit when an execution condition has been established based on the contact state of the sequence program immediately before and ON/OFF of a bit showing execution/non-execution of an instruction in the last scan, and controls not to execute the reading/writing of the device information from/to the first storage unit or the second storage unit when an execution condition has not been established.

According to the above-mentioned aspect of this invention, upon input of an instruction to execute the reading/writing of the device information in a scan that a contact state of a sequence program immediately before has changed, a control is carried out such that the reading/writing of the device information from/to the first storage unit or the second storage unit is executed when an execution condition has been established based on the contact state of the sequence program immediately before and ON/OFF of a bit showing execution/non-execution of an instruction in the last scan. The reading/writing of the device information from/to the first storage unit or the second storage unit is not executed when an execution condition has not been established. Therefore, it is possible to decide execution/non-execution of an instruction in an instruction decoding section, according to the ON/OFF of a contact and the execution/non-execution information of an instruction in the last scan. During a non-execution time, a processing result is not read/written from/to the memory, thereby to shorten the non-execution processing time.

Furthermore, upon input of an instruction to be executed in a scan that a contact state of a sequence program immediately before has changed, the control unit stores the contact state into the third storage unit.

According to the above-mentioned aspect of this invention, upon input of an instruction to be executed in a scan that a contact state of a sequence program immediately before has changed, the contact state is stored into the third storage unit. Therefore, the instruction to be executed in the scan that a contact state of a sequence program immediately before is changed, can be processed at high speed in H/W.

Furthermore, when the microprocessor is to carry out the reading/writing from/to the first storage unit or the second storage unit during the execution of a pipeline processing based on the sequence programs, the control unit controls to stop the pipeline processing and make the microprocessor start the reading/writing from/to the first storage unit or the second storage unit.

According to the above-mentioned aspect of this invention, when the microprocessor is to carry out the reading/writing from/to the first storage unit or the second storage unit during the execution of a pipeline processing based on the sequence programs, a control to stop the pipeline processing and make the microprocessor start the reading/writing from/to the first storage unit or the second storage unit is carried out. Therefore, when the CPU carries out the reading/writing from/to a RAM, it is possible to stop the pipeline processing and execute the reading/writing, by only outputting a read/write request. Consequently, a high-speed processing is carried out. Further, when an interruption has occurred in the CPU, an exclusive RAM to save task information is not necessary. Therefore, it is possible to realize low cost and compactness.

Moreover, at the time of executing a S/W instruction processing, the control unit controls to stop the pipeline processing and make the microprocessor execute the S/W instruction when an execution condition has been established based on a contact state of a sequence program immediately before and ON/OFF of a bit showing execution/non-execution of an instruction in the last scan, and controls the microprocessor not to execute the S/W instruction when an execution condition has not been established.

According to the above-mentioned aspect of this invention, at the time of executing a S/W instruction processing, the control unit controls to stop the pipeline processing and make the microprocessor execute the S/W instruction when an execution condition has been established based on a contact state of a sequence program immediately before and ON/OFF of a bit showing execution/non-execution of an instruction in the last scan, and a control to make the microprocessor not execute the S/W instruction when an execution condition has not been established is carried out. Therefore, H/W decides a S/W instruction that does not need to be executed, and the microprocessor can avoid unnecessary processing. Consequently, it is possible to execute a high-speed processing of the S/W instruction.

BRIEF DESCRIPTION OF THE DRAWINGS

FIG. 4 is a diagram which shows a state that instruction codes are stored in a RAM 11 and a state that an instruction execution/non-execution state in the last scan for each instruction is stored in a RAM 13, FIG. 7 is a diagram which shows instruction codes stored in the RAM 11, FIG. 8 is a timing chart which shows the execution of instructions shown in FIG. 7 when a device allocated to an area of a RAM 12 is used, FIG. 11 is a diagram which shows instruction codes stored in the RAM 11, FIG. 12 is a timing chart which shows the execution of instructions shown in FIG. 11 when the device allocated to the area of the RAM 12 is used, in a scan that a contact state stored in a contact state storage section 24 has been changed from OFF to ON, FIG. 13 is a timing chart when an interruption occurred in a CPU 31 for example during a pipeline processing, and the CPU 31 has written task information to the RAM 11, FIG. 14 is a diagram which shows a pipeline processing when a condition for executing a S/W instruction has been established.

BEST MODE FOR CARRYING OUT THE INVENTION

Embodiments of the programmable controller according to the present invention will be explained in detail below with reference to the accompanying drawings.

Figure 1:
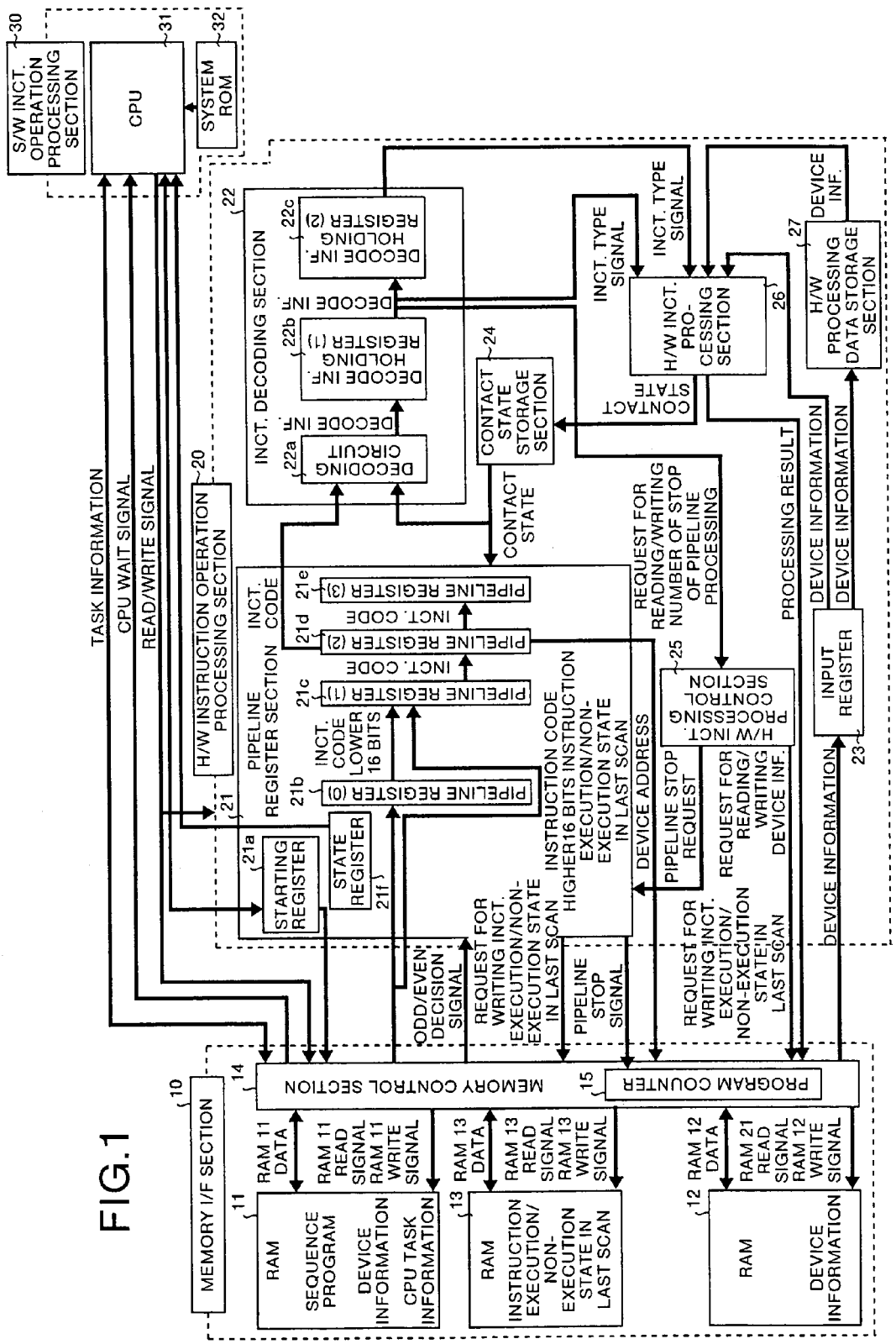
FIG. 1 is a block diagram which shows a structure of a programmable controller according to this embodiment.

FIG. 1 is a block diagram which shows a structure of a programmable controller according to this invention. This programmable controller consists of a memory interface section 10 (hereinafter to be referred to as a "memory I/F section"), a H/W instruction operation processing section 20 that processes an instruction in hardware (H/W), and a S/W instruction operation processing section 30 that processes an instruction in software (S/W).

First, a structure of the memory I/F section 10 will be explained. The reference numeral 11 denotes a RAM which stores sequence programs and device information used in the sequence processing, and in which a CPU stores task information, 12 denotes a RAM that stores only device information used in the sequence processing, and 13 denotes a RAM that stores an execution/non-execution state in the last scan.

The reference numeral 14 denotes a memory control section that controls the H/W instruction operation processing section 20 to read/write from/to the RAM 11, the RAM 12 and the RAM 13, and controls the S/W instruction operation processing section 30 to read/write from/to the RAM 11, the RAM 12 and the RAM 13, and 15 denotes a program counter that is sequentially incremented at each reference clock (not shown) of the operation of the H/W instruction operation processing section 20.

Next, a structure of the H/W instruction operation processing section 20 will be explained. The reference numeral 21a denotes a starting register that starts (1)/stops (0) a pipeline processing, and 21b denotes a pipeline register (pipeline register (0)) that sequentially reads low-order data of instruction codes stored in the RAM and temporarily holds the low-order data.

The reference numeral 21c denotes a pipeline register (pipeline register (1)) that sequentially reads a low-order data of an instruction code held in the pipeline register 21b, a high-order data of an instruction code stored in the RAM 11, and an execution/non-execution state (1 bit) in the last scan of the RAM 13, and that holds the instruction code+1 bit data, 21d denotes a pipeline register (pipeline register (2)) that transfers the contents of the pipeline register 21c, and 21e denotes a pipeline register (pipeline register (3)) that transfers the contents of the pipeline register 21d.

The reference numeral 21f denotes a state register that shows a state of a pipeline processing (for example, 0: during the stopping of a pipeline processing, 1: during the execution of a pipeline processing, 2: during the stopping of a pipeline processing due to the execution of a S/W instruction), and 22a denotes a decoding circuit that decodes data stored in the pipeline register 21d.

The reference numeral 22b denotes a decode information holding register (a decode information holding register (1)) that holds the contents decoded by the decoding circuit 22a, and 22c denotes a decode information holding register (a decode information holding register (2)) that holds the contents of the decode information holding register 22b.

The reference numeral 23 denotes an input register that temporarily stores device information read from the RAM 11 or the RAM 12, 24 denotes a contact state storage section that holds a state of a contact, and 25 denotes a H/W instruction processing control section that controls a request for reading/writing device information, a request for stopping a pipeline, and a request for writing the instruction execution/non-execution state in the last scan that are used in the processing of H/W instructions of the RAM 11 and the RAM 12.

The reference numeral 26 denotes a H/W instruction processing section that executes a bit processing and a word processing (an arithmetic processing, a logic processing, a transfer) according to the decode information of the decode information holding register 22b and the decode information holding register 22c, and 26 denotes a H/W processing data storage section that stores word processing data read from the RAM 11 and the RAM 12.

A structure of the S/W instruction operation processing section 30 will now be explained. The reference numeral 31 denotes a CPU that processes a sequence instruction written in the RAM 11 when this instruction is the instruction to be executed in S/W, and 32 denotes a system ROM in which the processing contents of the CPU 31 are described.

Figure 2:
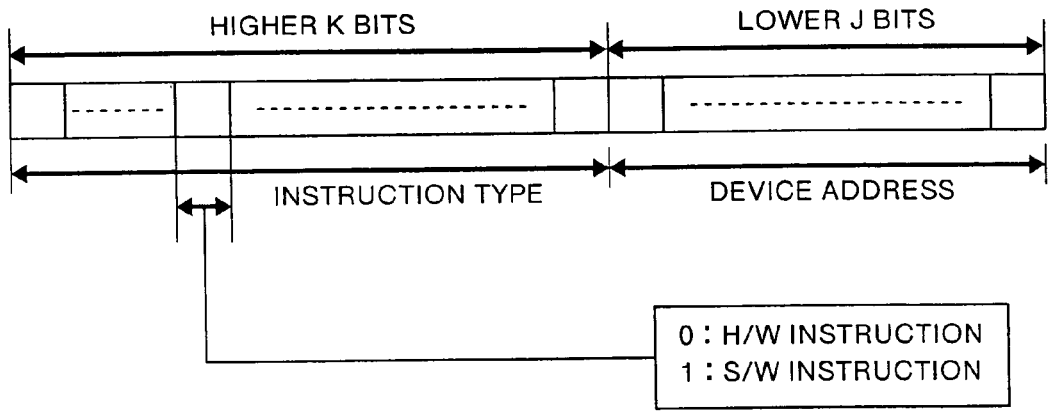
FIG. 2 is an explanatory diagram which explains a structure of an instruction code.

A structure of an instruction code will be explained. FIG. 2 is an explanatory diagram which explains a structure of an instruction code. As shown in the drawing, lower J bits represent an address in which device information is stored (hereinafter to be referred to as a "device address"), and a RAM to be used for reading/writing device information is assigned by this device address.

Moreover, higher K bits represent a type of an instruction. When a value of a bit that distinguishes between a S/W instruction and a H/W instruction in the instruction code is 0, the instruction becomes a H/W instruction, and when the value is 1, the instruction becomes a S/W instruction.

When the device address has assigned the RAM 11, the reading of an instruction code from the RAM 11 is interrupted, and device information is read from this RAM 11. This function will be explained using FIG. 3.

Figure 3:
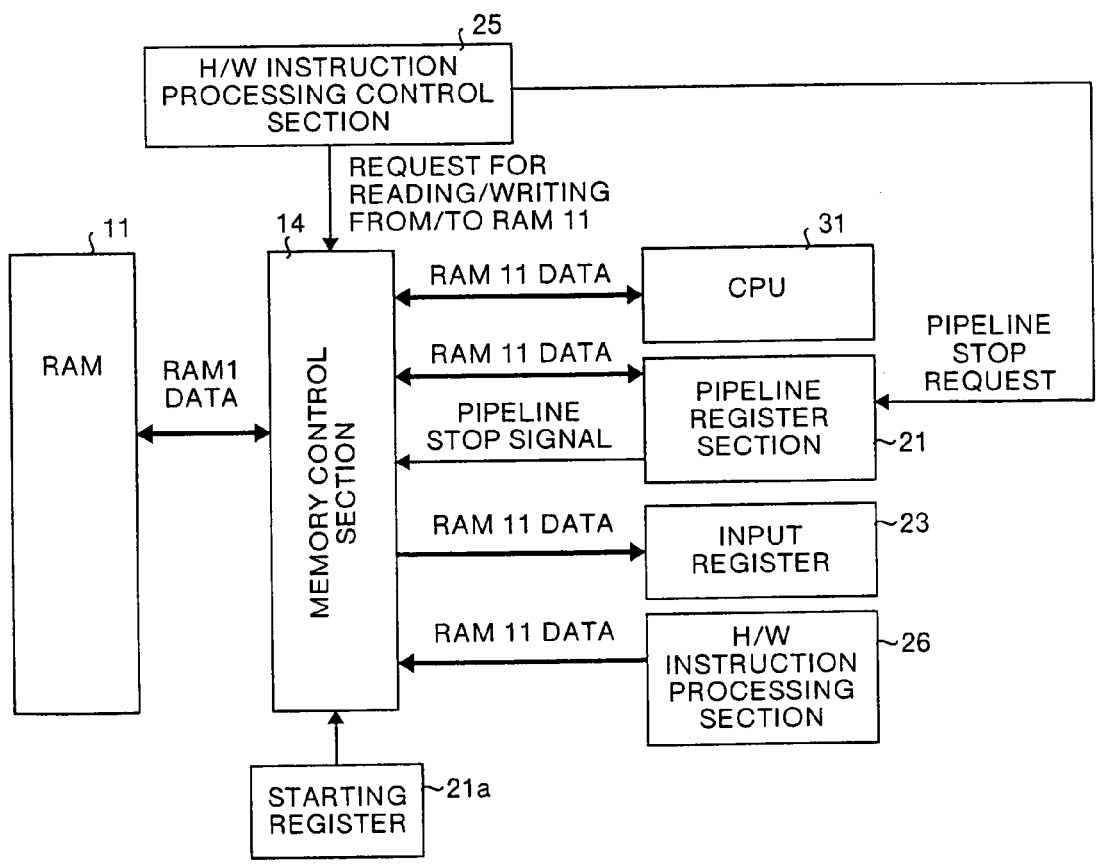
FIG. 3 is an explanatory diagram which explains an access control of a memory control section to a RAM.

FIG. 3 is an explanatory diagram which explains an access control of the memory control section 14 to the RAM 11. While the starting register 21a is 0, the memory control section 14 connects between a data bus of the RAM 11 and a data bus of the CPU 31. While the starting register is at 1, the memory control section 14 connects between the pipeline register section 21 and the data bus of the RAM 11, and sequentially reads instruction codes of the RAM 11.

However, while the pipeline stop signal that is output from the pipeline register section 21 is at 1, the memory control section 14 masks the read signal of an instruction code. Therefore, the reading of the instruction code from the RAM 11 is interrupted.

When a request for reading from the RAM 11 has been output from the H/W instruction processing control section 25, the data buses of the input register 23 and the RAM 11 are connected together, and device information is read from the RAM 11 and is stored into the input register 23. When a request for writing to the RAM 11 has been output from the H/W instruction processing control section 25, the data buses of the H/W instruction processing section 26 and the RAM 11 are connected together, and a processing result is written to the RAM 11.

Therefore, when the reading/writing of the device information from/to the RAM 11 according to the H/W instruction has occurred while an instruction code is being read after the programmable controller has been started, the reading/writing of the device information has a priority, and the reading/writing of the device information is executed.

FIG. 4 is a diagram which shows a state that instruction codes are stored in the RAM 11 and a state that an instruction execution/non-execution state in the last scan for each instruction is stored in the RAM 13. As shown in the drawing, an instruction code is divided into a low-order data and a high-order data, and they are stored in the RAM 11. The instruction code of a H/W instruction (1) is stored in address $2n$ and address $2n+1$ of the RAM 11. Further, an instruction execution/non-execution state of the H/W instruction (1) in the last scan is stored in address n of the RAM 13.

When an operation of the programmable controller is started ("the programmable controller has been started"), the CPU 31 sets various kinds of registers, and thereafter starts or sets the starting register 21a to 1, following the contents (not shown) written in the system ROM 32 shown in FIG. 1. When the starting register 21a has been set to 1, the pipeline stop signal output from the pipeline register section 21 becomes 0, and the program counter 15 starts counting.

The memory control section 14 connects the data buses between the pipeline register section 21 and the RAM 11, and sequentially reads instruction codes from addresses shown by the program counter 15. The address at which the instruction execution/no-execution state of the last scan is stored is generated by shifting the value of the program counter 15 to the right by one bit.

Figure 5:
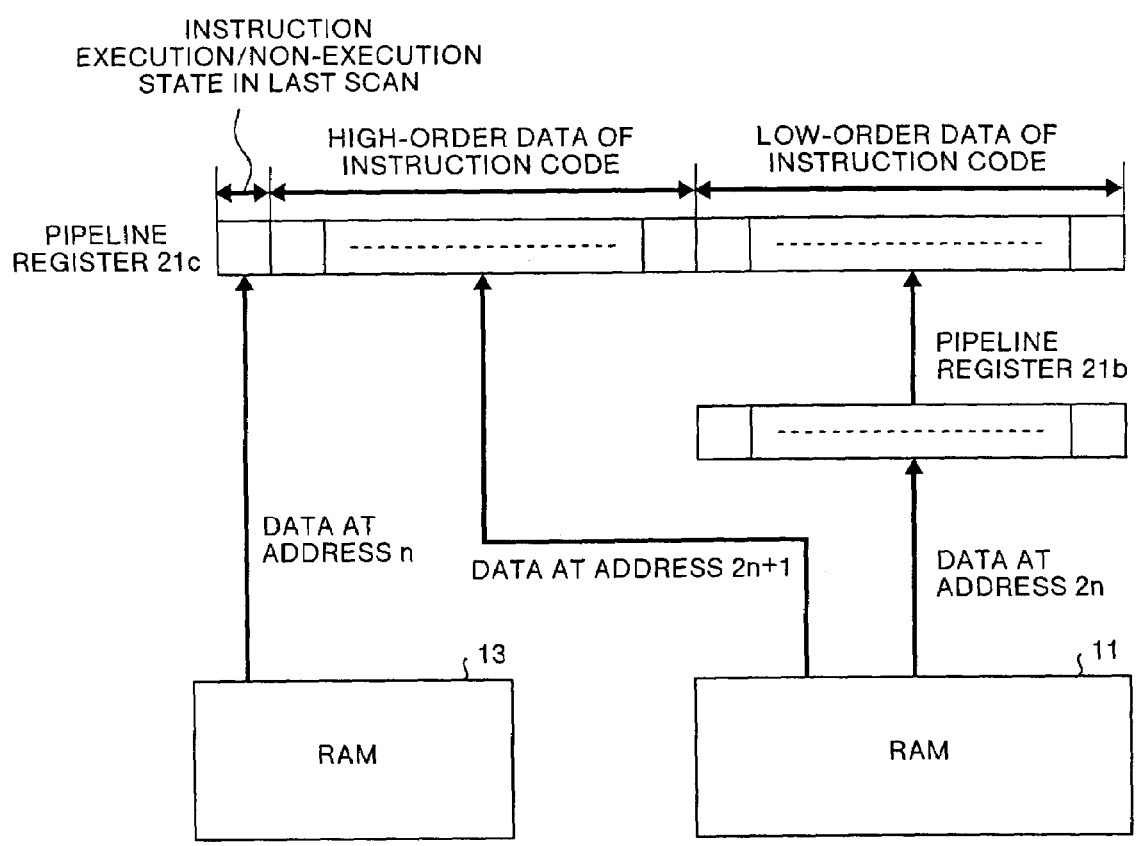
FIG. 5 is an explanatory diagram which explains points at which instruction codes after starting a programmable controller and the instruction execution/non-execution state in the last scan are transferred to a pipeline register 21c.

FIG. 5 is an explanatory diagram which explains points at which instruction codes after starting the programmable controller and the instruction execution/non-execution state in the last scan are transferred to the pipeline register 21c. The memory control section 14 reads the low-order data of the instruction code of the H/W instruction (1) at the address $2n$ of the RAM 11 (the value of the program counter 15) shown in FIG. 4, and stores this data into the pipeline register 21b. After the address $2n$ of the RAM 11 has been read, the value of the program counter 15 is incremented to become $2n+1$.

Next, the memory control section 14 reads the high-order data of the instruction code of the H/W instruction (1) at the address $2n+1$ of the RAM 13 and the execution/non-execution state of the H/W instruction (1) in the last scan at the address n of the RAM 13 (the value of the program counter 15 that has been shifted to the right by one bit), and stores them into the pipeline register 21c together with the low-order data of the instruction code of the H/W instruction (1) stored in the pipeline register 21b. At this time, the value of the program counter 15 is incremented to become $2n+2$. Thereafter, in a similar procedure, instruction codes and the execution/non-execution states of instructions in the last scans are stored into the pipeline register 21c in the order of the H/W instruction (2) and the S/W instruction (1).

Next, the pipeline processing of an instruction code transferred to the pipeline register 21c and the instruction execution/non-execution state in the last scan will be explained using FIG. 1. The memory control section 14 generates a signal that becomes 1 when a lowest-order bit value of the program counter 15 is 0, and that becomes 0 when the lowest-order bit value is 1 (hereinafter to be referred to as an "odd/even decision signal"), and outputs the generated signal to the pipeline register section 21. In other words, the odd/even decision signal is at 1 when the low-order data of the instruction code is read, and becomes 0 when the high-order data of the instruction code is read.

When the odd/even decision signal changes from 1 to 0, the instruction code of the pipeline register 21c and the instruction execution/non-execution state in the last scan are transferred to the pipeline register 21d. Further, when the odd/even decision signal changes from 0 to 1, the instruction code of the pipeline register 21d and the instruction execution/non-execution state in the last scan are transferred to the pipeline register 21e. When a pipeline stop signal has been output from the pipeline register section 21 to the memory control section 14, the odd/even decision signal does not change since the program counter 15 is configured such that it does not execute the increment.

When the odd/even decision signal does not change, the contents of the pipeline register 21c, the pipeline register 21d, and the pipeline register 21e are not updated. Therefore, the pipeline processing is interrupted. When the instruction code and the instruction execution/non-execution state in the last scan are stored into the pipeline register 21d, a decision is made whether the instruction is a H/W instruction or a S/W instruction, based on the bit that distinguishes between a S/W instruction and a H/W instruction in the instruction code.

When the bit that distinguishes between a S/W instruction and a H/W instruction in the instruction code is 1 (the S/W instruction), a condition for executing the S/W instruction is decided based on the instruction execution/non-execution state in the last scan and the contact state in the contact state storage section 24, within the pipeline register section 21. When the execution condition has been established, the starting register 21a is stopped or set to 0. While the starting register 21a is at 0, the pipeline stop signal remains at 1, and therefore, the pipeline processing stops.

After the pipeline processing has stopped, the pipeline register section 21 changes the state register 21f from 1 to 2. The CPU 31 monitors the state register 21f, and upon confirming that the state register 21f is at 2, the CPU 31 executes the processing of the S/W instruction. After executing the S/W instruction, the CPU 31 starts or sets the starting register 21a to 1, thereby to start the pipeline processing that has been stopped so far. When the starting register 21a has changed to 1, the state register 21f also changes from 2 to 1.

The decoding circuit 22a decodes the instruction code of the pipeline register 21d. Based on the decoding of the device address by the decoding circuit 22a, it is decided whether the RAM that stores the device information to be used in the sequence instruction is the RAM 11 or the RAM 12.

Figure 6:
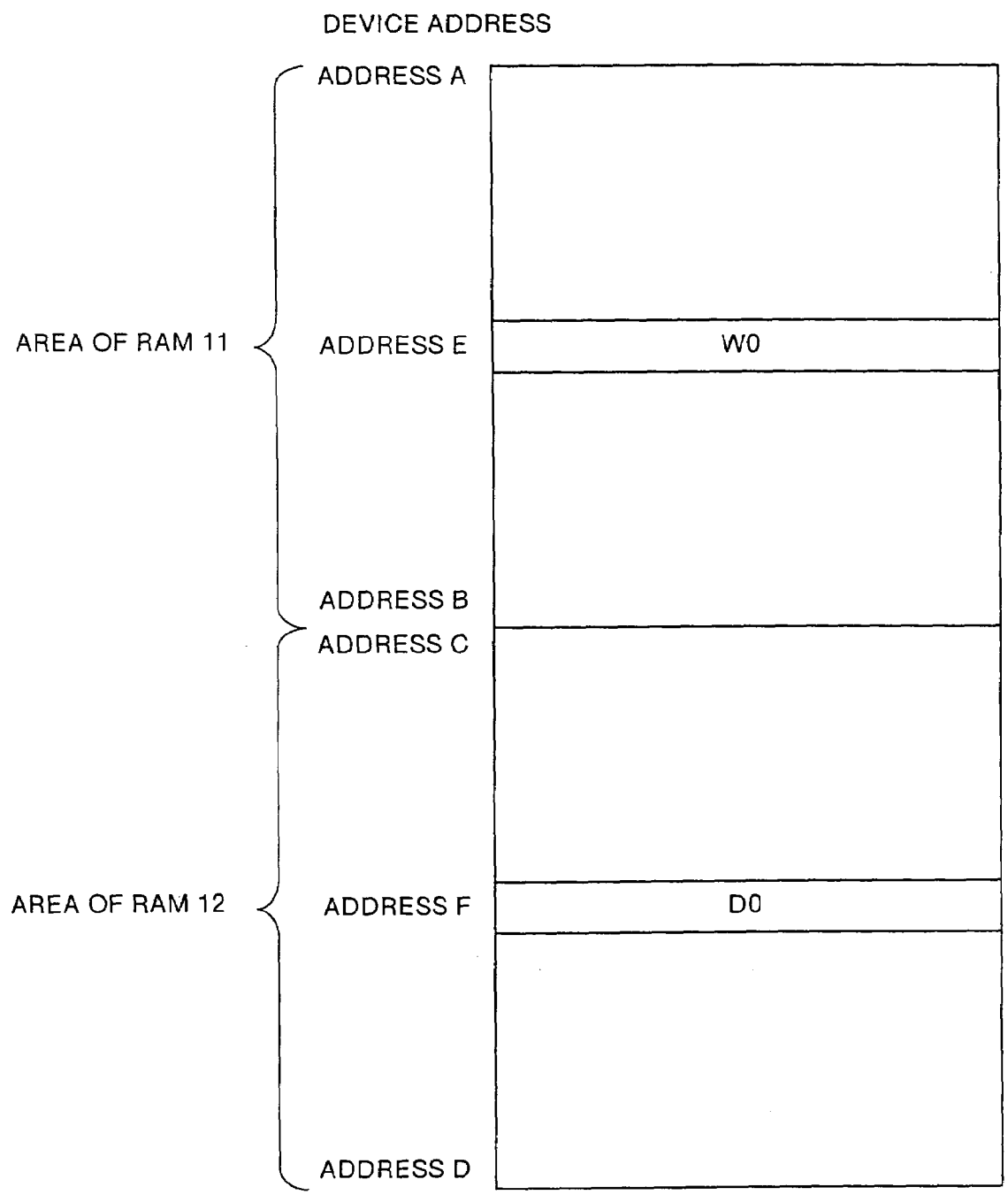
FIG. 6 is a diagram which shows an example of a device allocation to be used in an instruction.

FIG. 6 is a diagram which shows an example of a device allocation to be used in an instruction. Address A to address B of the device address form an area for the RAM 11, and address C to address D form an area for the RAM 12. For example, assume that a device W0 is allocated to the area of the RAM 11, and a device D0 is allocated to the area of the RAM 12, as shown in FIG. 6. Then, when a user has used the device W0 at the time of preparing a sequence program, address E is written to the RAM 11 as the device address.

Similarly, when the device D0 is used, address F is written to the RAM 11 as the device address. Therefore, at the time of preparing a program, when a high-speed processing is necessary, the user can use the device D0, and when a high-speed processing is not necessary, the user can use the device W0.

When the device address has assigned the RAM 11 (the address A to the address B in the above example), the decoding circuit 22a stores a number of stop of pipeline processing that is necessary to execute the processing when the device information of the RAM 11 is used, presence or absence of reading/writing device information from/to the RAM 11, and a type of instruction, into the decode information holding register 22b as decode information. In this instance, as it is not possible to read the instruction code when device information is read/written as described above, it is necessary to interrupt the reading of the instruction code and the pipeline processing.

Therefore, when device information is read/written from/to the RAM 11, the number of stop of pipeline becomes at least 1. On the other hand, when the device address has assigned the RAM 12 (the address C to the address D in the above example), a number of stop of pipeline processing that is necessary to execute the processing when the device information of the RAM 12 is used, presence or absence of reading/writing device information from/to the RAM 12, and a type of instruction are stored, into the decode information holding register 22b as decode information.

When the decoding information has been stored into the decode information holding register 22b, the decoding information is output from the decode information holding register 22b to the H/W instruction processing control section 25. When the device address has assigned the RAM 11, the H/W instruction processing control section 25 outputs a request for reading/writing device information from/to the RAM 11, to the memory control section 14, and outputs a request for stopping the pipeline to the pipeline register section 21.

Upon receiving the request for stopping the pipeline from the H/W instruction processing control section 25, the pipeline register section 21 sets the pipeline stop signal to 1, thereby to stop the pipeline processing. When the pipeline stop signal has become 1, the memory control section 14 masks the read signal of the instruction code, and does not execute the increment of the program counter 15.

When the memory control section 14 has received a request for reading/writing device information from/to the RAM 11 from the H/W instruction processing control section 25, the memory control section 14 connects the data buses between the input register 23 or the H/W instruction processing section 26 and the RAM 11, and executes the reading/writing of the device information from/to the RAM 11 according to the sequence instruction.

On the other hand, when the device address has assigned the RAM 12, the H/W instruction processing control section 25 outputs a request for reading/writing device information from/to the RAM 12, to the memory control section 14. When the memory control section 14 has received the request for reading/writing from/to the RAM 12 from the H/W instruction processing control section 25, the memory control section 14 executes the reading/writing of the device information from/to the RAM 12 according to the sequence instruction, while executing the reading of the instruction code from the RAM 11.

When the decoding information has been stored into the decode information holding register 22c, the instruction type signal in the decode information holding register 22c is output to the H/W instruction processing section 26, the read device information is processed, and a result of the processing is stored into the contact state storage section 24, the RAM 11, and the RAM 12.

FIG. 7 is a diagram which shows instruction codes stored in the RAM 11. A H/W instruction (1) is a contact instruction to read device information stored in the RAM 11 or the RAM 12, and store a processing result into the contact state storage section 24. A H/W instruction (2) is a data load instruction to read device information stored in the RAM 11 or the RAM 12, and store the read device information into a H/W processing data storage section 27, regardless of contact information stored in the contact state storage section 24.

A H/W instruction (3) is an instruction for the H/W instruction processing section 26 to process the processing data stored in the H/W processing data storage section 27 and write back a processing result to the device of the RAM 11 or the RAM 12, when the contact information stored in the contact state storage section 24 is ON or 1.

FIG. 8 is a timing chart which shows the execution of instructions shown in FIG. 7 when the device allocated to the area of the RAM 12 is used (when the device address has assigned the RAM 12). The operation when the device address has assigned the area of the RAM 12 will be explained using FIG. 1, FIG. 7, and FIG. 8.

The section of the period T1 and T2 shows from the starting of the pipeline processing to the storage of an instruction code and an instruction execution/non-execution state in the last scan into the pipeline register 21*c* as described above. During the period T1, the low-order data of the instruction code of the H/W instruction (1) is read from the address 2*n* of the RAM 11, and during the period T2, the high-order data of the instruction code of the H/W instruction (1) is read from the address 2*n*+1 of the RAM 11.

The section of the period T3 shows that the value of the program counter 15 becomes 2*n*+2, and that the instruction code of the H/W instruction (1) and the instruction execution/non-execution state in the last scan have been stored into the pipeline register 21*c*. During this period, the low-order data of the instruction code of the H/W instruction (2) at the address 2*n*+2 of the RAM 11 is read.

The section of the period T4 shows that the value of the program counter 15 becomes 2*n*+3, and that when the odd/even decision signal has changed from 1 to 0, the instruction code of the H/W instruction (1) and the instruction execution/non-execution state in the last scan stored in the pipeline register 21*c* are stored into the pipeline register 21*d*. During this period, the instruction code of the H/W instruction (1) is decoded by the decoding circuit 22*a*. Based on the decoding by the decoding circuit 22*a*, the instruction type signal showing the H/W instruction (1) is generated.

Further, as the device address has assigned the RAM 12, the request of the H/W instruction (1) for reading device information from the RAM 12 and the signal showing that the number of stop of pipeline processing is 0 are generated. Further, during this period, the high-order data of the instruction code of the H/W instruction (2) at the address 2*n*+3 of the RAM 11 is read.

The section of the period T5 shows that the value of the program counter 15 becomes 2*n*+4, and that the instruction code of the H/W instruction (2) and the instruction execution/non-execution state in the last scan are transferred to the pipeline register 21*c*. When the odd/even decision signal has changed from 0 to 1, the instruction code of the H/W instruction (1) and the instruction execution/non-execution state in the last scan stored in the pipeline register 21*d* are stored into the pipeline register 21*e*, and the decode information of the H/W instruction (1) in the decoding circuit 22*a* is transferred to the decode information holding register 22*b*.

When the decode information of the H/W instruction (1) has been transferred to the decode information holding register 22*b*, the request of the H/W instruction (1) for reading device information from the RAM 12 and the signal showing that the number of stop of pipeline processing is 0 are output to the H/W instruction processing control section 25. As the signal showing that the number of stop of pipeline processing is 0 has been output from the decode information holding register 22*b* to the H/W instruction processing control section 25, the pipeline stop request is not set to 1, and the pipeline processing is not interrupted.

The H/W instruction processing control section 25 outputs the request for reading device information from the RAM 12, to the memory control section 14, and the memory control section 14 reads the device information from the RAM 12 and stores it into the input register 23. During this period, the low-order data of the instruction code of the H/W instruction (3) at the address 2*n*+4 of the RAM 11 is read.

The section of the period T6 shows that the value of the program counter 15 becomes 2*n*+5, and that when the odd/even decision signal has changed from 1 to 0, the instruction code of the H/W instruction (2) and the instruction execution/non-execution state in the last scan stored in the pipeline register 21*c* are stored into the pipeline register 21*d*, and the decode information of the H/W instruction (1) in the decode information holding register 22*b* is transferred to the decode information holding register 22*c*.

When the decode information of the H/W instruction (1) has been transferred to the decode information holding register 22*c*, the instruction type signal showing the H/W instruction (1) is output to the H/W instruction processing section 26, the device information stored in the input register 23 during the period T5 is processed, and a processing result is stored into the contact state storage section 24.

FIG. 8 shows an instance where the read device information is ON or 1, and in this instance, ON or 1 is stored into the contact state storage section 24. During this period, the instruction code of the H/W instruction (2) is decoded by the decoding circuit 22*a*. Based on the decoding by the decoding circuit 22*a*, the instruction type signal showing the H/W instruction (2) is generated.

As the device address has assigned the RAM 12, the request of the H/W instruction (2) for reading device information from the RAM 12 and the signal showing that the number of stop of pipeline processing is 0 are generated. Further, during this period, the high-order data of the instruction code of the H/W instruction (3) at the address 2*n*+5 of the RAM 11 is read.

The section of the period T7 shows that the value of the program counter 15 becomes 2*n*+6, and that the instruction code of the H/W instruction (3) and the instruction execution/non-execution state in the last scan are transferred to the pipeline register 21*c*. When the odd/even decision signal has changed from 0 to 1, the instruction code of the H/W instruction (2) and the instruction execution/non-execution state in the last scan of the pipeline register 21*d* are stored into the pipeline register 21*e*, and the decode information of the H/W instruction (2) of the decode circuit 22*a* in the decoding circuit 22*a* is transferred to the decode information holding register 22*b*.

When the decode information of the H/W instruction (2) has been transferred to the decode information holding register 22*b*, the request of the H/W instruction (2) for reading device information from the RAM 12 and the signal showing that the number of stop of pipeline processing is 0 are output to the H/W instruction processing control section 25. As the signal showing that the number of stop of pipeline processing is 0 has been output from the decode information holding register 22*b* to the H/W instruction processing control section 25, the pipeline stop request is not set to 1, and the pipeline processing is not interrupted.

The H/W instruction processing control section 25 outputs the request for reading device information from the RAM 12, to the memory control section 14, and the memory control section 14 reads the device information from the RAM 12 and stores it into the input register 23. During this period, the low-order data of the instruction code of the H/W instruction (4) at the address 2*n*+6 of the RAM 11 is read.

The section of the period T8 shows that the value of the program counter 15 becomes 2n+7, and that the instruction code of the H/W instruction (3) and the instruction execution/non-execution state in the last scan stored in the pipeline register 21c have been stored into the pipeline register 21d, and the decode information of the H/W instruction (2) in the decode information holding register 22b has been transferred to the decode information holding register 22c.

When the decode information of the H/W instruction (2) has been transferred to the decode information holding register 22c, the instruction type signal showing the H/W instruction (2) is output to the H/W instruction processing section 26, the device information stored in the input register 23 during the period T7 is stored into the H/W processing data storage section 27. During this period, the instruction code of the H/W instruction (3) is decoded by the decoding circuit 22a. Based on the decoding by the decoding circuit 22a, the instruction type signal showing the H/W instruction (3) is generated.

As the device address has assigned the RAM 12, and also as the contact state stored in the contact state storage section 24 is ON or 1, the condition for executing the H/W instruction (3) is established. The request of the H/W instruction (3) for writing device information to the RAM 12 and the signal showing that the number of stop of pipeline processing is 0 are generated. During this period, the high-order data of the instruction code of the H/W instruction (4) at the address 2n+7 of the RAM 11 is read.

The section of the period T9 shows that the value of the program counter 5 becomes 2n+8, and that the instruction code of the H/W instruction (4) and the instruction execution/non-execution state in the last scan are transferred to the pipeline register 21c. When the odd/even decision signal has changed from 0 to 1, the instruction code of the H/W instruction (3) and the instruction execution/non-execution state in the last scan of the pipeline register 21d are stored into the pipeline register 21e, and the decode information of the H/W instruction (3) in the decoding circuit 22a is transferred to the decode information holding register 22b.

When the decode information of the H/W instruction (3) has been transferred to the decode information holding register 22b, the instruction type signal showing the H/W instruction (3) is output to the H/W instruction processing section 26, and the device information stored in the H/W processing data storage section 27 during the period T8 is processed by the H/W instruction processing section 26. During this period, the low-order data of the instruction code of the H/W instruction (5) at the address 2n+8 of the RAM 11 is read.

The section of the period T10 shows that the value of the program counter 15 becomes 2n+9, and that when the odd/even decision signal has changed from 1 to 0, the instruction code of the H/W instruction (4) and the instruction execution/non-execution state in the last scan of the pipeline register 21c are stored into the pipeline register 21d, and the decode information of the H/W instruction (3) in the decode information holding register 22b is transferred to the decode information holding register 22c.

When the decode information of the H/W instruction (3) has been transferred to the decode information holding register 22c, the instruction type signal showing the H/W instruction (3) is output to the H/W instruction processing section 26. The H/W instruction processing section 26 outputs the data processed during the period T9 to the memory control section 14. The H/W instruction processing control section 25 outputs a request for writing to the RAM 12 during this period to the memory control section 14, and the memory control section 14 writes a result of processing the H/W instruction (3) to the RAM 12. During this period, the decoding circuit 22a decodes the instruction code of the H/W instruction (4). During this period, the high-order data of the instruction code of the H/W instruction (5) at the address 2n+9 of the RAM 11 is read.

Figure 9:
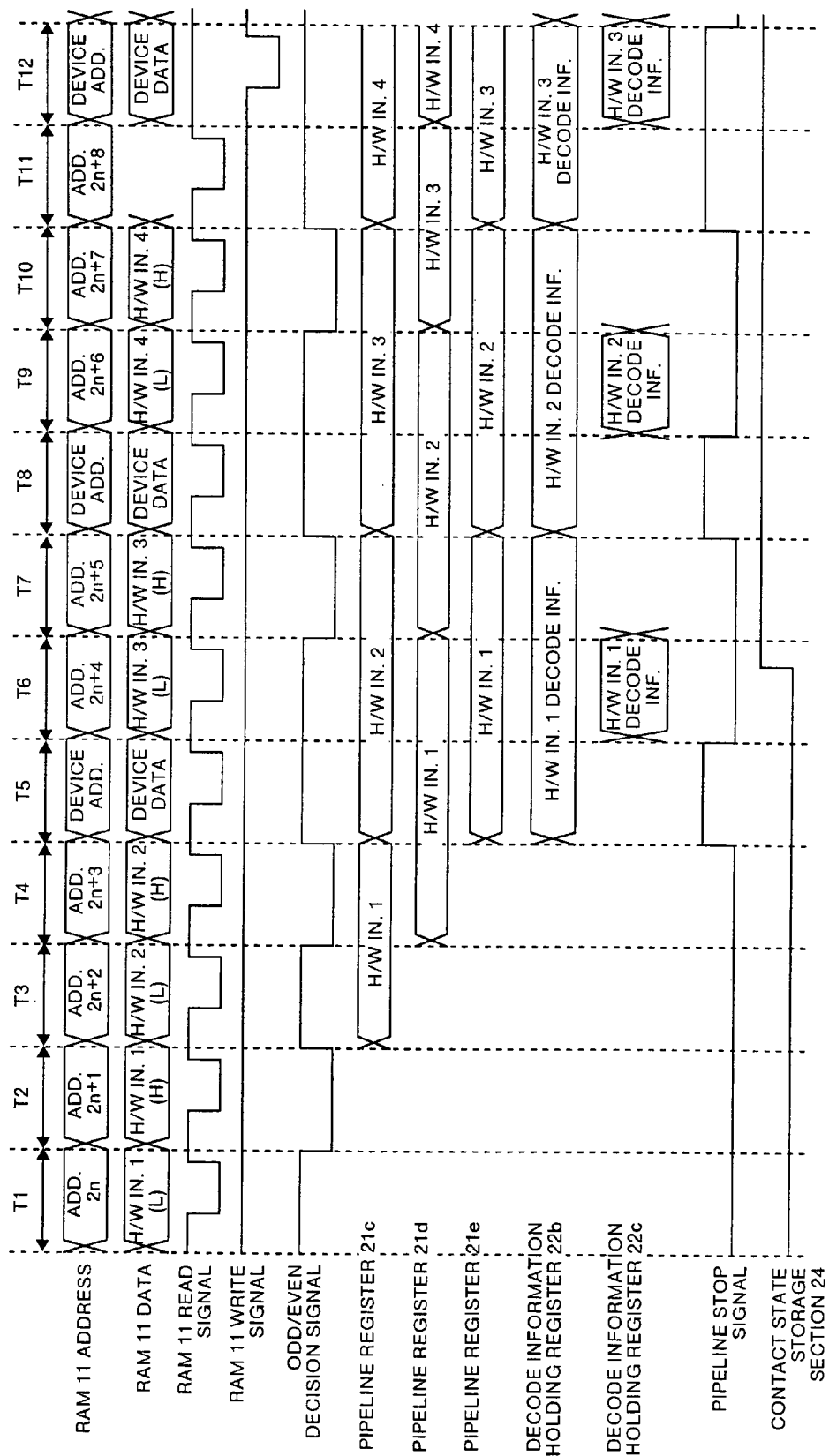
FIG. 9 is a timing chart which shows the execution of instructions shown in FIG. 7 when a device allocated to an area of a RAM 11 is used.

FIG. 9 is a timing chart which shows the execution of instructions shown in FIG. 7 when the device allocated to the area of the RAM 11 is used (when the device address has assigned the RAM 11). The operation when the device address has assigned the area of the RAM 11 will be explained using FIG. 1, FIG. 7, and FIG. 9.

The section of the period T1 and T2 shows from the starting of the pipeline processing to the storage of an instruction code and an instruction execution/non-execution state in the last scan into the pipeline register 21c as described above. During the period T1, the low-order data of the instruction code of the H/W instruction (1) is read from the address 2n of the RAM 11, and during the period T2, the high-order data of the instruction code of the H/W instruction (1) is read from the address 2n+1 of the RAM 11.

The section of the period T3 shows that the value of the program counter 15 becomes 2n+2, and that the instruction code of the H/W instruction (1) and the instruction execution/non-execution state in the last scan have been stored into the pipeline register 21c. During this period, the low-order data of the instruction code of the H/W instruction (2) at the address 2n+2 of the RAM 11 is read.

The section of the period T4 shows that the value of the program counter 15 becomes 2n+3, and that when the odd/even decision signal has changed from 1 to 0, the instruction code of the H/W instruction (1) and the instruction execution/non-execution state in the last scan of the pipeline register 21c are stored into the pipeline register 21d. During this period, the instruction code of the H/W instruction (1) is decoded by the decoding circuit 22a. Based on the decoding by the decoding circuit 22a, the instruction type signal showing the H/W instruction (1) is generated.

Further, as the device address has assigned the RAM 11, the request of the H/W instruction (1) for reading device information from the RAM 11 and the signal showing that the number of stop of pipeline processing is 1 are generated. Further, during this period, the high-order data of the instruction code of the H/W instruction (2) at the address 2n+3 of the RAM 11 is read.

The section of the period T5 shows that the value of the program counter 5 becomes 2n+4, and that the instruction code of the H/W instruction (2) and the instruction execution/non-execution state in the last scan are transferred to the pipeline register 21c. When the odd/even decision signal has changed from 0 to 1, the instruction code of the H/W instruction (1) and the instruction execution/non-execution state in the last scan of the pipeline register 21d are stored into the pipeline register 21e, and the decode information of the H/W instruction (1) in the decoding circuit 22a is transferred to the decode information holding register 22b.

When the decode information of the H/W instruction (1) has been transferred to the decode information holding register 22b, the request of the H/W instruction (1) for reading device information from the RAM 11 and the signal showing that the number of stop of pipeline processing is 1 are output to the H/W instruction processing control section 25. The H/W instruction processing control section 25 outputs the request for reading device information from the RAM 11, to the memory control section 14, and sets the pipeline stop request to 1.

As the pipeline stop request is at 1, the pipeline register section 21 sets the pipeline stop signal to 1. As the pipeline stop signal is at 1, the memory control section 14 masks the read signal of the instruction code, and does not execute the increment of the program counter 15. The odd/even decision signal does not change from 1 either.

When the memory control section 14 has received a request for reading/writing from/to the RAM 11 from the H/W instruction processing control section 25, the memory control section 14 connects the data buses between the input register 23 and the RAM 11, reads the device information from the RAM 11 and stores it into the input register 23. As the odd/even decision signal does not change from 1 in the pipeline register section 21, the pipeline register 21c, the pipeline register 21d, and the pipeline register 21e are not updated.

The pipeline stop request is set to 1 at the timing when the instruction code and the instruction execution/non-execution state in the last scan have been transferred to the pipeline register 21e. The instruction code and the instruction execution/non-execution state in the last scan are transferred to the pipeline register 21e after the odd/even decision signal has changed from 0 to 1. In other words, the pipeline stop request is set to 1 and the pipeline processing stops, after the high-order data of the instruction code has been read, without exception. The pipeline processing is not interrupted until when one instruction code has finished reading.

During the period T6, the value of the program counter 15 is 2n+4, and the contents of the pipeline register 21c, the pipeline register 21d, and the pipeline register 21e are not changed since the period T5. However, the decode information of the H/W instruction (1) in the decode information holding register 22b has been transferred to the decode information holding register 22c.

When the decode information of the H/W instruction (1) has been transferred to the decode information holding register 22c, the instruction type signal showing the H/W instruction (1) is output to the H/W instruction processing section 26, the device information stored in the input register 23 during the period T5 is processed, and a processing result is stored into the contact state storage section 24.

FIG. 9 shows an instance where the read device information is ON or 1, and in this instance, ON or 1 is stored into the contact state storage section 24. During this period, the low-order data of the instruction code of the H/W instruction (3) at the address 2n+4 of the RAM 11 is read.

The section of the period T7 shows that the value of the program counter 15 becomes 2n+5, and that when the odd/even decision signal has changed from 1 to 0, the instruction code of the H/W instruction (2) and the instruction execution/non-execution state in the last scan of the pipeline register 21c are stored into the pipeline register 21d. During this period, the instruction code of the H/W instruction (2) is decoded by the decoding circuit 22a, and the instruction type signal showing the H/W instruction (2) is generated. Further, as the device address has assigned the RAM 11, the request of the H/W instruction (2) for reading device information from the RAM 11 and the signal showing that the number of stop of pipeline processing is 1 are generated. During this period, the high-order data of the instruction code of the H/W instruction (3) at the address 2n+5 of the RAM 11 is read.

The section of the period T8 shows that the value of the program counter 15 becomes 2n+6, and that the instruction code of the H/W instruction (3) and the instruction execution/non-execution state in the last scan are transferred to the pipeline register 21c. When the odd/even decision signal has changed from 0 to 1, the instruction code of the H/W instruction (2) and the instruction execution/non-execution state in the last scan of the pipeline register 21d are stored into the pipeline register 21e, and the decode information of the H/W instruction (2) in the decoding circuit 22a is transferred to the decode information holding register 22b.

When the decode information of the H/W instruction (2) has been transferred to the decode information holding register 22b, the request of the H/W instruction (2) for reading device information from the RAM 11 and the signal showing that the number of stop of pipeline processing is 1 are output to the H/W instruction processing control section 25. The H/W instruction processing control section 25 outputs the request for reading device information from the RAM 11, to the memory control section 14, and sets the pipeline stop request to 1.

As the pipeline stop request is at 1, the pipeline register section 21 sets the pipeline stop signal to 1. As the pipeline stop signal is at 1, the memory control section 14 masks the read signal of the instruction code, and does not execute the increment of the program counter 15. As the odd/even decision signal does not change from 1 in the pipeline register section 21, the pipeline register 21c, the pipeline register 21d, and the pipeline register 21e are not updated.

When the memory control section 14 has received a request for reading device information from the RAM 11 from the H/W instruction processing control section 25, the memory control section 14 connects the data buses between the input register and the RAM 11, reads the device information from the RAM 11 and stores it into the input register 23.

During the period T9, the value of the program counter 15 is 2n+6, and the contents of the pipeline register 21c, the pipeline register 21d, and the pipeline register 21e are not changed since the period T8. However, the decode information of the H/W instruction (2) in the decode information holding register 22b has been transferred to the decode information holding register 22c.

When the decode information of the H/W instruction (2) has been transferred to the decode information holding register 22c, the instruction type signal of the H/W instruction (2) is output to the H/W instruction processing section 26, and the device information stored in the input register 23 during the period T8 is stored into the H/W processing data storage section 27. During this period, the low-order data of the instruction code of the H/W instruction (4) at the address 2n+6 of the RAM 11 is read.

The section of the period T10 shows that the value of the program counter 15 becomes 2n+7, and that when the odd/even decision signal has changed from 1 to 0, the instruction code of the H/W instruction (3) and the instruction execution/non-execution state in the last scan of the pipeline register 21c are stored into the pipeline register 21d. During this period, the instruction code of the H/W instruction (3) is decoded by the decoding circuit 22a. Based on the decoding by the decoding circuit 22a, the instruction type signal of the H/W instruction (3) is generated.

As the device address has assigned the RAM 11, and also as the contact state stored in the contact state storage section 24 is ON or 1, the condition for executing the H/W instruction (3) is established. The request for writing device information to the RAM 11 and the signal showing that the number of stop of pipeline processing is 2 are generated. During this period, the high-order data of the instruction code of the H/W instruction (4) at the address 2n+7 of the RAM 11 is read.

The section of the period T11 shows that the value of the program counter 15 becomes 2n+8, and that the instruction code of the H/W instruction (4) and the instruction execution/non-execution state in the last scan are transferred to the pipeline register 21c. When the odd/even decision signal has changed from 0 to 1, the instruction code of the H/W instruction (3) and the instruction execution/non-execution state in the last scan of the pipeline register 21d are stored into the pipeline register 21e, and the decode information of the H/W instruction (3) in the decoding circuit 22a is transferred to the decode information holding register 22b.

When the decode information of the H/W instruction (3) has been transferred to the decode information holding register 22b, the instruction type signal showing the H/W instruction (3) is output to the H/W instruction processing section 26, and the device information stored in the H/W processing data storage section 27 during the period T10 is processed by the H/W instruction processing section 26. The request for writing device information to the RAM 11 and the signal showing that the number of stop of pipeline processing is 2 are output from the decode information holding register 22b to the H/W instruction processing control section 25.

As the H/W instruction processing control section 25 has received the signal showing that the number of stop of pipeline processing is 2 from the decode information holding register 22b, the pipeline stop request is set to 1. As the pipeline stop request is at 1, the pipeline register section 21 sets the pipeline stop signal to 1. As the pipeline stop signal is at 1, the memory control section 14 masks the read signal of the instruction code, and does not execute the increment of the program counter 15.

As the odd/even decision signal does not change from 1 in the pipeline register section 21, the pipeline register 21c, the pipeline register 21d, and the pipeline register 21e are not updated. During this period, as the pipeline stop signal is at 1, and also as the read signal of the instruction code has been masked, the reading of the instruction code is not executed. As the request for reading/writing from/to the RAM 11 has not been output from the H/W instruction processing control section 25, there is no access to the RAM 11.

During the period T12, the value of the program counter is 2n+8, and the contents of the pipeline register 21c, the pipeline register 21d, and the pipeline register 21e are not changed since the period T11. However, the decode information of the H/W instruction (3) in the decode information holding register 22b has been transferred to the decode information holding register 22c. When the decode information of the H/W instruction (3) has been transferred to the decode information holding register 22c, the instruction type signal of the H/W instruction (3) is output to the H/W instruction processing section 26, and the data processed during the period T11 is output to the memory control section 14. As the signal showing that the number of stop of pipeline processing is 2 has been output from the decode information holding register 22b during the period T11, the pipeline stop request remains at 1 during the period T12 as well.

Therefore, the pipeline register section 21 keeps the pipeline stop signal at 1 during the period T12 too. As the pipeline stop signal is at 1, the memory control section 14 masks the read signal of the instruction code, and the program counter 15 does not execute the increment.

As the odd/even decision signal does not change from 1 in the pipeline register section 21, the pipeline register 21c, the pipeline register 21d, and the pipeline register 21e are not updated. As the request for writing to the RAM 11 has been received from the decode information holding register 22b during the period T11, the H/W instruction processing control section 25 outputs there quest for writing to the RAM 11 to the memory control section 14 during this period. The memory control section 14 connects the data buses between the H/W instruction processing section 26 and the RAM 11, and writes a result of processing the H/W instruction (3) to the RAM 11.

As described above, when the decoding circuit 22a decodes the instruction code stored in the pipeline register 21d, the device address is decoded. Based on this, it is decided which one of the device information stored in the RAM 11 and the RAM 12 is to be used. When the device address has assigned the area of the RAM 12, the decoding circuit 22a outputs the signal showing that the number of stop of pipeline processing is 0, unlike the assignment of the RAM 11. Therefore, the pipeline register section 21 does not set the pipeline stop signal to 1. As the pipeline stop signal is not set to 1, the reading of the instruction code from the RAM 11 and the pipeline processing are not interrupted. Therefore, it is possible to simultaneously carry out the reading of the instruction code from the RAM 11 and the reading/writing of the device information from/to the RAM 12. As a result, it is possible to execute the processing at high speed.

On the other hand, when the device address has assigned the area of the RAM 11, both the reading of the instruction code and the reading/writing of the device information are carried out from/to the RAM 11. Therefore, during the reading/writing of the device information, it is necessary to set the pipeline stop signal to 1 and interrupt the reading of the instruction code and the pipeline processing. However, as the RAM 12 is not used, it is possible to realize compactness and low cost by avoiding the installation of the RAM 12. Further, in the present embodiment, it is possible to differentiate the use of the two types of structures in the same hardware by changing the device address.

Further, while the address of the interface between the RAM 11 and the RAM 12 is fixed in the present embodiment, it is also possible to change over the address of the interface between the RAM 11 and the RAM 12 by using a register, thereby to make variable the capacities of the RAM 11 and the RAM 12. Further, although one instruction code is read through reading at two times, it is also possible to realize the above function in the structure of reading the instruction code at one time thereby reducing the reading cycle of instruction codes and executing high-speed processing.

Figure 10:
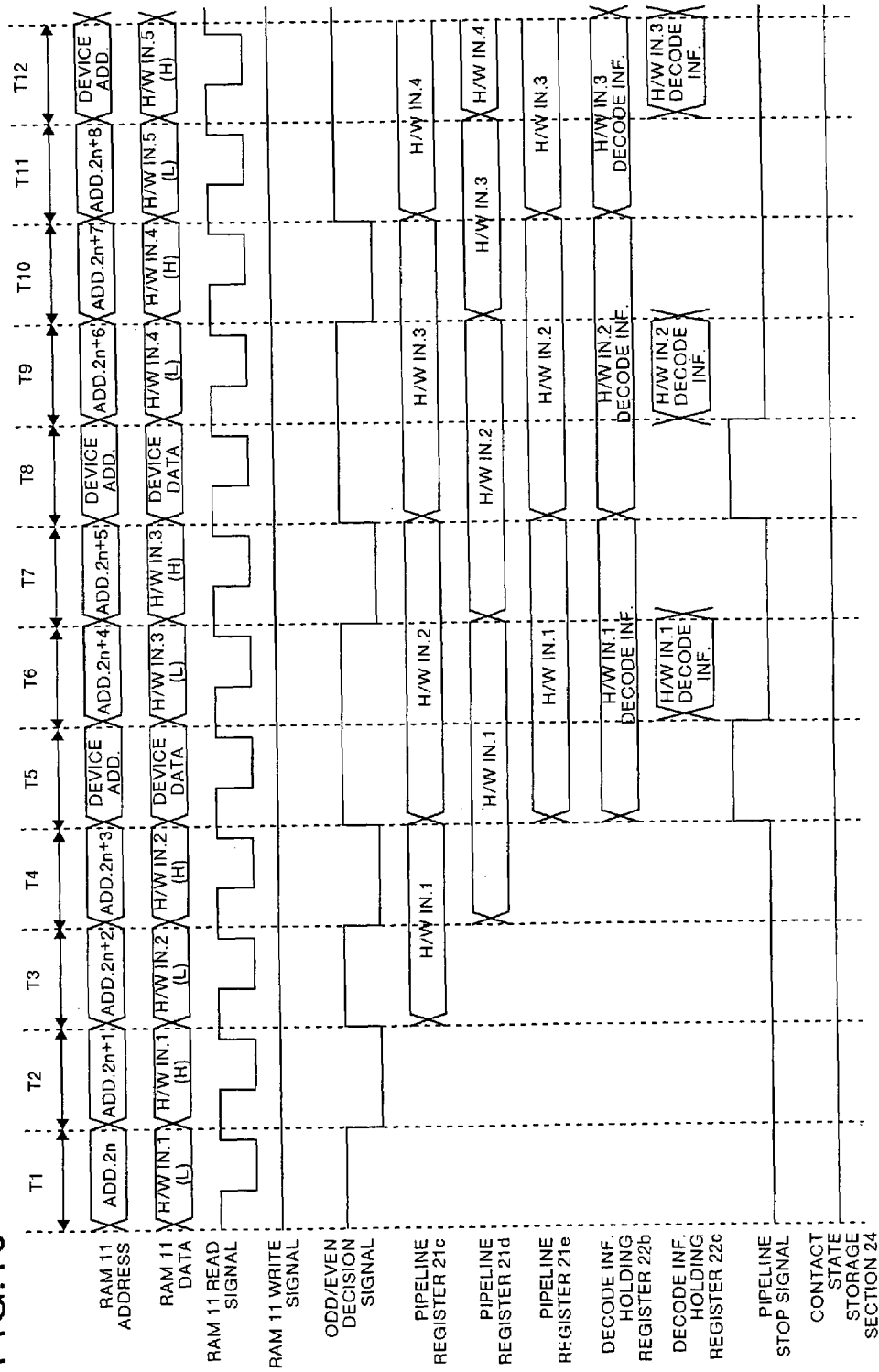
FIG. 10 is a timing chart which shows the execution of instructions shown in FIG. 7 when a device allocated to an area of a RAM 11 is used, where device information read at a H/W instruction (1) is OFF or 0.

FIG. 10 is a timing chart which shows the execution of instructions shown in FIG. 7 when a device allocated to an area of a RAM 11 is used, where device information read at a H/W instruction (1) is OFF or 0. The operation of executing the instructions shown in FIG. 7 when the device information of the RAM 11 is used, where device information read at the H/W instruction (1) is OFF, will be explained with reference to FIG. 1, FIG. 7, and FIG. 10.

The operation during the period T1 to T9 is the same as that described with reference to FIG. 9. However, when the H/W instruction (3) is decoded by the decoding circuit 22a during the period T10, the contact state in the contact state storage section 24 is OFF or 0. Therefore, the condition for executing the H/W instruction (3) is not established. Consequently, the H/W instruction (3) is not executed, and the signal showing that the number of stop of pipeline processing is 0 is output from the decoding circuit 22a as the decode information. The request for writing to the RAM 11 is not output.

As the processing result is not written to the RAM 11, the result is the same as that the H/W instruction (3) is not executed. Further, as the signal showing that the number of stop of pipeline processing is 0 is output from the decode information holding register 22b, the H/W processing control section 25 does not set the pipeline stop request to 1. Consequently, the pipeline stop signal is not set to 1, and the memory control section 14 does not mask the read signal of the instruction code. As a result, the reading of the instruction code is not interrupted, and the processing speed becomes faster than that during the execution of the instruction.

As described above, the decoding circuit 22a decides the execution/non-execution of the instruction based on the contact state stored in the contact state storage section 24, and does not output the request for reading/writing device information to the memory control section as decode information. Therefore, when the execution condition has been established, device information is read/written, and when the execution condition has not been established, device information is not read/written. By avoiding the reading/writing of the device information of the instruction that does not need to be executed, there is an effect that it is possible to increase the processing speed when the instruction is not executed.

FIG. 11 is a diagram which shows instruction codes stored in the RAM 11. A H/W instruction (1) is a contact instruction to read device information stored in the RAM 11 or the RAM 12, and store a processing result into the contact state storage section 24. A H/W instruction (2) is a data load instruction to read device information stored in the RAM 11 or the RAM 12, and store the read device information into a H/W processing data storage section 27, regardless of contact information stored in the contact state storage section 24.

A H/W instruction (6) is an instruction to decide execution/non-execution based on the contact state in the contact state storage section 15 and the execution/non-execution state of an instruction in the last scan of the RAM 13 (the execution condition is established when the execution/non-execution state of an instruction in the last scan is OFF (0) and the contact state is ON (1)), and instruct the H/W instruction processing section 26 to process the processing data stored in the H/W processing data storage section 27 and write back a processing result to the device of the RAM 11 or the RAM 12, when the execution condition has been established.

FIG. 12 is a timing chart which shows the execution of instructions shown in FIG. 11 when the device allocated to the area of the RAM 12 is used, in a scan that a contact state stored in the contact state storage section 24 changed from OFF (0) to ON (1) (when the device address has assigned the RAM 12). The operation based on the H/W instruction (6) will be explained using FIG. 1, FIG. 11, and FIG. 12.

The section of the period T8 shows that the value of the program counter 15 becomes 2n+7, and that when the odd/even decision signal has changed from 1 to 0, the instruction code of the H/W instruction (6) and the instruction execution/non-execution state in the last scan of the pipeline register 21c are stored into the pipeline register 21d, and the decode information of the H/W instruction (2) in the decode information holding register 22b is transferred to the decode information holding register 22c. During this period, the instruction code of the H/W instruction (6) is decoded by the decoding circuit 22a.

As the contact state stored in the contact state storage section 24 is ON or 1, and also as the instruction execution/non-execution state in the last scan read from the address n+2 of the RAM 13 at the time of transferring the instruction code to the pipeline register 21c is the non-execution or 0, the condition for executing the H/W instruction (6) is established. Further, as the device address has assigned the RAM 12, the request for writing to the RAM 12, the signal showing that the number of stop of pipeline processing is 1, and the request for wiring the instruction execution/non-execution state in the last scan are output. During this period, the high-order data of the instruction code of the H/W instruction (4) at the address 2n+7 of the RAM 11 is read.

The section of the period T9 shows that the value of the program counter 15 becomes 2n+8, and that the instruction code of the H/W instruction (4) and the instruction execution/non-execution state in the last scan are transferred to the pipeline register 21c. When the odd/even decision signal has changed from 0 to 1, the instruction code of the H/W instruction (6) and the instruction execution/non-execution state in the last scan of the pipeline register 21d are stored into the pipeline register 21e, and the decode information of the H/W instruction (6) in the decoding circuit 22a is transferred to the decode information holding register 22b.

When the decode information of the H/W instruction (6) has been transferred to the decode information holding register 22b, the instruction type signal of the H/W instruction (6) is output to the H/W instruction processing section 26, and the device information stored in the H/W processing data storage section 27 during the period T8 is processed by the H/W instruction processing section 26.

As the signal showing that the number of stop of pipeline processing is 1 has been output from the decode information holding register 22b, the H/W instruction processing control section 25 sets the pipeline stop request to 1. As the pipeline stop request is at 1, the pipeline register section 21 sets the pipeline stop signal to 1. As the pipeline stop signal is at 1, the memory control section 14 masks the read signal of the instruction code, and does not execute the increment of the program counter 15.

As the odd/even decision signal does not change from 1 in the pipeline register section 21, the pipeline register 21c, the pipeline register 21d, and the pipeline register 21e are not updated.

During the period T1, the value of the program counter 15 is 2n+8, and the contents of the pipeline register 21c, the pipeline register 21d, and the pipeline register 21e are not changed since the period T9. However, the decode information of the H/W instruction (6) in the decode information holding register 22b has been transferred to the decode information holding register 22c. When the decode information of the H/W instruction (6) has been transferred to the decode information holding register 22c, the instruction type signal of the H/W instruction (6) is output to the H/W instruction processing section 26, and the data processed during the period T9 is output to the memory control section 14.

The H/W instruction processing control section 25 outputs the request for writing to the RAM 12 to the memory control section 14 during this period. The memory control section 14 writes a result of processing the H/W instruction (6) to the RAM 12. At the same time, the H/W instruction processing control section 25 outputs there quest for writing the execution/non-execution state in the last scan to the memory control section 14.

When there has not been the request for writing the execution/non-execution state in the last scan, the address in the RAM 13 is generated by shifting the value of the program counter 15 to the right. However, when there has been the request for writing the execution/non-execution state in the last scan, the contact state stored in the contact state storage section 24 is written to the address (generated by subtracting 2 from the value obtained by shifting the value of the program counter 15 to the right) of the H/W instruction (6) in the RAM 13. During this period, the low-order data of the instruction code of the H/W instruction (5) is read from the RAM 11.

The section of the period T11 shows that the value of the program counter 15 becomes $2n+9$, and that when the odd/even decision signal has changed from 1 to 0, the instruction code of the H/W instruction (4) and the instruction execution/non-execution state in the last scan of the pipeline register $21c$ are stored into the pipeline register $21d$. During this period, the instruction code of the H/W instruction (5) is read from the address $2n+9$ in the RAM 11.

As there has not been the request for writing the execution/non-execution state in the last scan from the H/W instruction processing control section 25, the memory control section 14 generates the address in the RAM 13 by shifting the value of the program counter 15 to the right, and reads the execution/non-execution state in the last scan from the address n+4 in the RAM 13.

When the condition for executing the H/W instruction (6) has not been established, the device information is not written to the RAM 11 or the RAM 12. However, the pipeline stop signal is set to 1 to interrupt the pipeline processing, and the operation of storing the contact state into the RAM 13 is carried out.

As explained above, the address in the RAM 13 is generated by subtracting 2 and by shifting the value of the program counter 15 to the right at the time of processing the instruction, the contact state in the contact state storage section 24 is stored, and they are used together with the contact state in the next scan for deciding the execution/non-execution of the instruction. Based on this, it is possible to process the instruction to execute only the scan of the changed contact state, efficiently and at high speed in H/W.

Further, the decoding circuit $22a$ decides the execution/non-execution of the instruction based on the contact state in the contact state storage section 15 and the execution/non-execution state of an instruction in the last scan of the RAM 13, and does not output the request for reading/writing device information to the memory control section as decode information. Therefore, device information is read/written during execution, and device information is not read/written during non-execution. As a result, there is an effect that the processing speed during non-execution is increased.

FIG. 13 is a timing chart which shows an instance when an interruption has occurred in the CPU 31 for example during a pipeline processing, and the CPU 31 has written task information to the RAM 11. When the CPU 31 tries to write task information to the RAM 11, the CPU 31 outputs the write signal to the memory control section 14.

As the starting register is at 1 (during the starting of the pipeline processing), the memory control section 14 connects the data buses between the RAM 11 and the pipeline register section 21. Therefore, as the CPU 31 cannot write to the RAM 11, the memory control section 14 outputs a CPU wait signal to the CPU 31.

On the other hand, when the pipeline register section 21 has received the write signal from the CPU 31, the pipeline processing is stopped after the high-order data of the instruction code has been read. When the pipeline processing has stopped, the processing is executed up to the instruction (H/W instruction (2)) stored in the pipeline register $21d$.

After completing the H/W instruction (2), the memory control section 14 connects the data buses between the RAM 11 and the CPU 31, and the task information of the CPU 31 is written to the RAM 11. To start the pipeline processing again after completing the processing of the CPU 31, the CPU 31 writes 1 to the starting register $21a$. By this, the pipeline processing stops based on only the output of the write request when the CPU 31 executes reading/writing from/to the RAM 11. Therefore the task information can be saved thus the processing speed is increased.

FIG. 14 is a diagram which shows a pipeline processing when a condition for executing a S/W instruction has been established. The pipeline processing when the execution condition has been established after the input of the instruction code of the S/W instruction will be explained using FIG. 1 and FIG. 14.

The section of the period T6 shows that the value of the program counter 15 becomes $2n+5$, and that when the odd/even decision signal has changed from 1 to 0, the instruction code of the S/W instruction (1) and the instruction execution/non-execution state in the last scan of the pipeline register $21c$ are stored into the pipeline register $21d$.

When the instruction code of the S/W instruction (1) and the instruction execution/non-execution state in the last scan have been stored into the pipeline register $21d$, the condition for executing the S/W instruction is decided within the pipeline register section 21 based on the instruction execution/non-execution state in the last scan and the contact state in the contact state storage section 24, as the bit for distinguishing between the S/W instruction and the H/W instruction in the instruction code is 1 (S/W instruction).

During the period T7, when the condition for executing the S/W instruction (1) has been established, the pipeline register section 21 sets the starting register $21a$ to 0, and stops the pipeline processing. When the starting register $21a$ has been set to 0, the pipeline register section 21 sets 2 (during the stop of pipeline processing due to the execution of the S/W instruction) to the storage register. Further, the request for writing the instruction execution/non-execution state in the last scan is output to the memory control section 14.

Based on the request for writing the instruction execution/non-execution state in the last scan, the memory control section 14 writes the contact state stored in the contact state storage section 24 to the address (the address obtained by subtracting 2 from the value obtained by shifting the value of the program counter 15 to the right) at which the instruction execution/non-execution state in the last scan of the S/W instruction (1) in the RAM 13 is stored.

The CPU 31 monitors the state register $21f$ and having confirmed that 2 has been set to the state register $21f$, starts the processing of the S/W instruction. When the processing of the S/W instruction has been finished, the CPU 31 writes 1 to the starting register $21a$, and restarts the pipeline processing.

Figure 15:
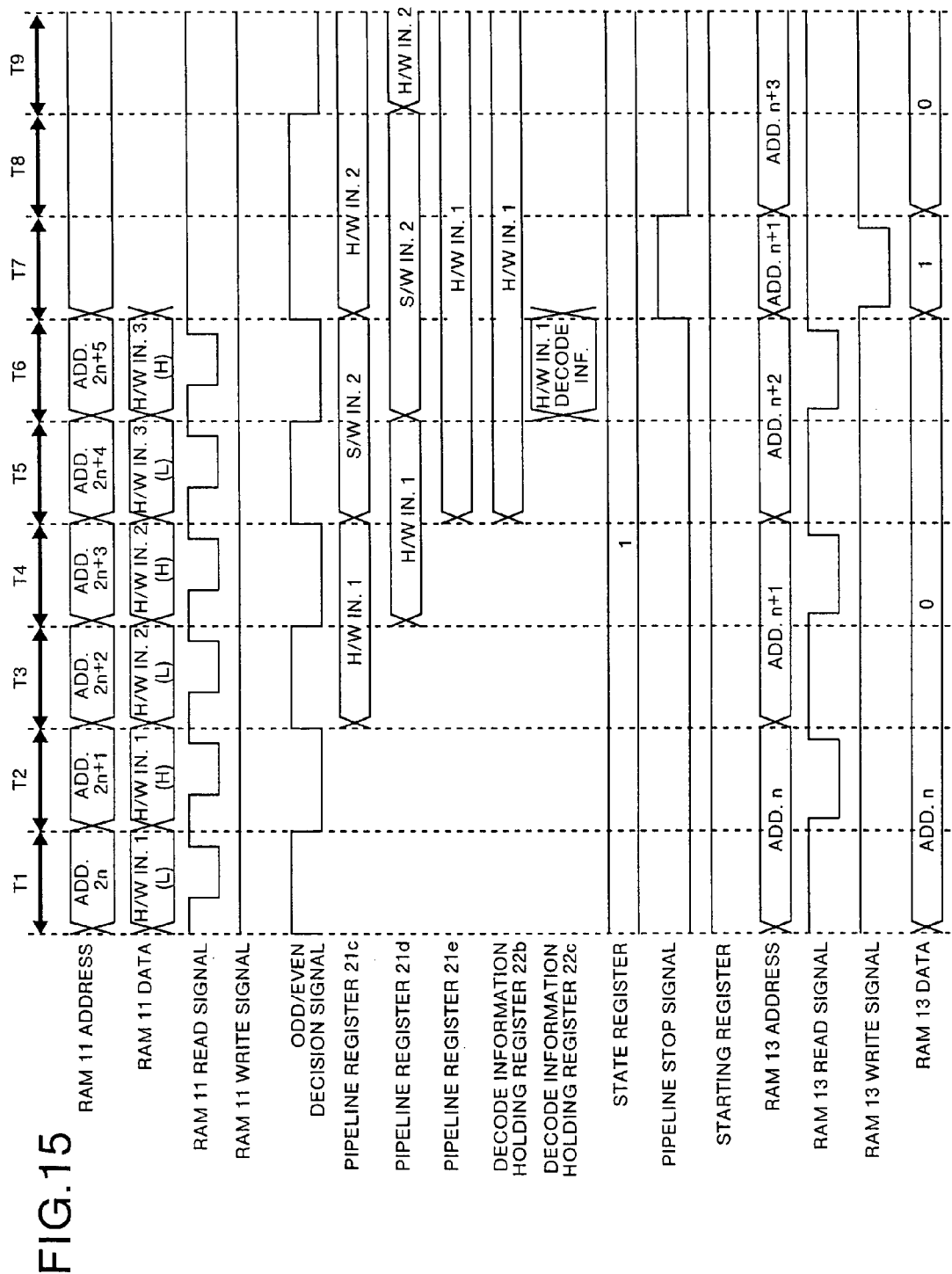
FIG. 15 is an explanatory diagram which explains a pipeline processing when a condition for executing a S/W instruction has not been established.
Figure 16:
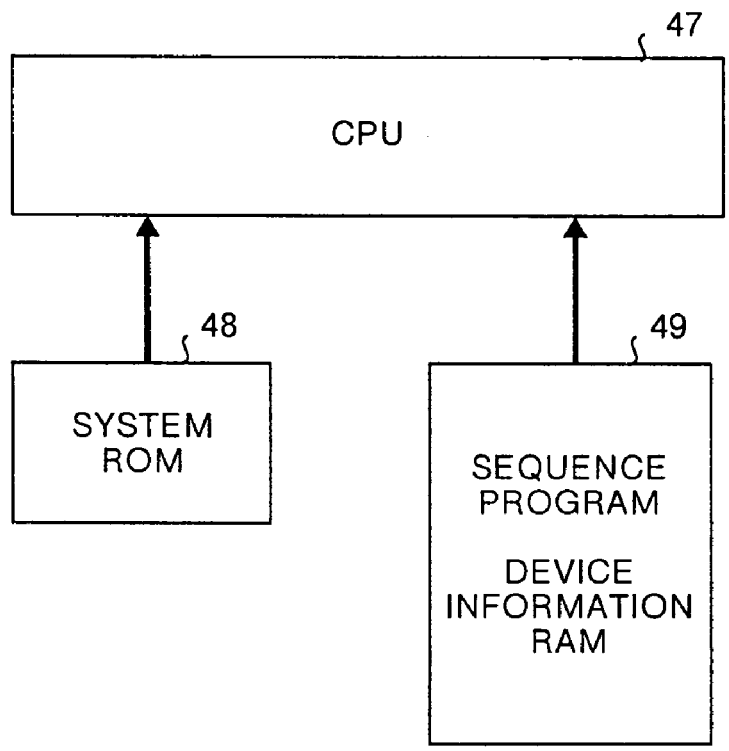
FIG. 16 is a block diagram which shows a structure of a conventional general programmable controller.
Figure 17:
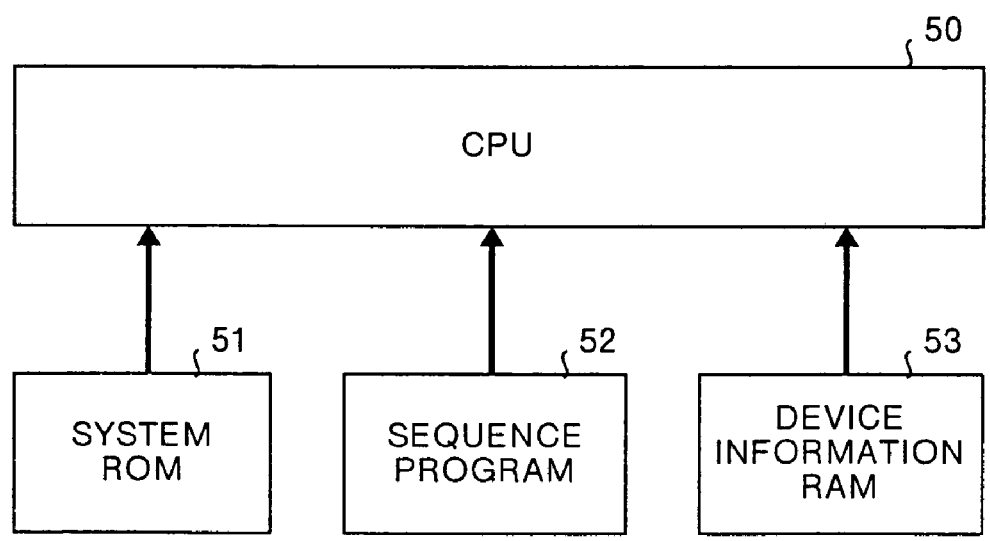
FIG. 17 is a block diagram which shows a structure of a prior-art programmable controller.

FIG. 15 is an explanatory diagram which explains a pipeline processing when a condition for executing a S/W instruction has not been established. The pipeline processing when the execution condition has not been established after the input of the instruction code of the S/W instruction will be explained using FIG. 1 and FIG. 15.

The section of the period T6 shows that the value of the program counter 15 becomes 2n+5, and that when the odd/even decision signal has changed from 1 to 0, the instruction code of the S/W instruction (1) and the instruction execution/non-execution state in the last scan of the pipeline register 21c are stored into the pipeline register 21d.

When the instruction code of the S/W instruction (1) and the instruction execution/non-execution state in the last scan have been stored into the pipeline register 21d, the condition for executing the S/W instruction is decided within the pipeline register section 21 based on the instruction execution/non-execution state in the last scan and the contact state in the contact state storage section 24, as the bit for distinguishing between the S/W instruction and the H/W instruction in the instruction code is 1 (S/W instruction).

During the period T7, when the condition for executing the S/W instruction (1) has not been established, the contact state in the contact state storage section 24 is written to the RAM 13 in a similar manner to that when the execution condition has been satisfied. During the next period T8, the pipeline stop signal is canceled. Further, the starting register 21a is kept at 1.

As described above, when the condition for executing the S/W instruction has been established, the pipeline processing is stopped, and the CPU executes the processing of the S/W instruction. After the execution, 1 is written to the starting register, and the pipeline processing is started again. On the other hand, when the execution condition has not been established, only the contact state is written to the RAM 13, and the CPU 31 continues the pipeline processing without executing the processing of the S/W instruction.

Therefore, H/W decides the S/W instruction that does not need to be executed, and the CPU 31 can avoid unnecessary processing. Consequently, it is possible to execute a high-speed processing of the S/W instruction. In the present embodiment, although one instruction code is read through reading at two times, it is also possible to realize the above function in the structure of reading the instruction code at one time thereby reducing the reading cycle of instruction codes and executing high-speed processing.

As described above, according to one aspect of the present invention, whether the device information is to be read/written from/to the first storage unit or the second storage unit is selected based on the sequence programs. It is configured such that when a sequence program to be read/written from/to the first storage unit has been input, a control is carried out such that the pipeline processing is interrupted during the reading/writing of the device information, and the reading of the sequence program is prohibited until the completion of the reading/writing of the device information. When a sequence program to be read/written from/to the second storage unit has been input, the reading/writing of the device information and the reading of a sequence program are carried out at the same time. Therefore, by only changing a device address, it is possible to differentiate the use of two types of structures in the same hardware, that is, a structure in which it is possible to execute the reading of an instruction code and the reading/writing of the device information simultaneously at high speed, and a structure excellent in compactness and low cost in which the number of memories used is reduced based on a shared use of a memory that stores instruction codes and device information.

According to another aspect of the present invention, the pipeline register is a register that collectively stores data of one sequence program when all of this data has been read from the first storage unit. It is configured such that a control is carried out such that the reading/writing of the device information from/to the first storage unit is not executed until when the reading of the data of the one sequence program has been completed. Therefore, it is possible to apply the pipeline register to read the data of one sequence program at a plurality of times.

Moreover, it is configured such that there is provided a third storage unit that stores a bit showing execution/non-execution of an instruction in the last scan, together with sequence programs. Therefore, it is possible to decide execution/non-execution of an instruction in an instruction decoding section, by utilizing execution/non-execution of an instruction in the last scan.

Furthermore, it is configured such that upon input of an instruction to execute the reading/writing of the device information, the reading/writing of the device information from/to the first storage unit or the second storage unit is executed when an execution condition has been established based on ON/OFF of a contact state of a sequence program immediately before. The reading/writing of the device information from/to the first storage unit or the second storage unit is not executed when an execution condition has not been established. Therefore, it is possible to decide execution/non-execution of an instruction in an instruction decoding section, according to the ON/OFF of a contact. During a non-execution time, a processing result is not read/written from/to a memory, thereby it is possible to shorten the non-execution processing time.

Moreover, it is configured such that upon input of an instruction to execute the reading/writing of the device information in a scan that a contact state of a sequence program immediately before has changed, a control is carried out such that the reading/writing of the device information from/to the first storage unit or the second storage unit is executed when an execution condition has been established based on the contact state of the sequence program immediately before and ON/OFF of a bit showing execution/non-execution of an instruction in the last scan. The reading/writing of the device information from/to the first storage unit or the second storage unit is not executed when an execution condition has not been established. Therefore, it is possible to decide execution/non-execution of an instruction in an instruction decoding section, according to the ON/OFF of a contact and the execution/non-execution information of an instruction in the last scan. During a non-execution time, a processing result is not read/written from/to a memory, thereby it is possible to shorten the non-execution processing time.

Furthermore, it is configured such that upon input of an instruction to be executed in a scan that a contact state of a sequence program immediately before has changed, the contact state is stored into the third storage unit. Therefore, the instruction to be executed in the scan that a contact state of a sequence program immediately before is changed, can be processed at high speed in H/W.

Moreover, it is configured such that when the microprocessor is to carry out the reading/writing from/to the first storage unit or the second storage unit during the execution of a pipeline processing based on the sequence programs, the pipeline processing is stopped and the microprocessor is made to start the reading/writing from/to the first storage unit or the second storage unit. Therefore, when the CPU carries out the reading/writing from/to a RAM, it is possible to stop the pipeline processing and execute the reading/writing, by only outputting a read/write request. Consequently, a high-speed processing is carried out. Further, when an interruption has occurred in the CPU, an exclusive RAM to save task information is not necessary. Therefore, it is possible to realize low cost and compactness.

Furthermore, it is configured such that at the time of executing a S/W instruction processing, the pipeline processing is stopped and the microprocessor is made to execute the S/W instruction when an execution condition has been established based on a contact state of a sequence program immediately before and ON/OFF of a bit showing execution/non-execution of an instruction in the last scan, and the microprocessor is controlled not to execute the S/W instruction when an execution condition has not been established. Therefore, H/W decides a S/W instruction that does not need to be executed, and unnecessary processing can be avoided. Consequently, it is possible to execute a high-speed processing of the S/W instruction.

INDUSTRIAL APPLICABILITY

As explained above, the programmable controller according to the present invention is suitable for executing the pipeline processing of sequence programs, and is useful in realizing low cost, compactness, and high-speed processing in the same hardware.

The invention claimed is:

1. A programmable controller that carries out a pipeline processing of sequence programs, comprising:
   at least a first storage unit and a second storage unit, the first storage unit storing the sequence programs, device information used for a sequence processing, task information of a microprocessor, and the second storage unit storing the device information;
   a pipeline register that sequentially reads and latches the sequence programs from the first storage unit;
   a selecting unit that selects whether the device information is to be read/written from/to the first storage unit or the second storage unit based on the sequence programs; and
   a control unit that controls to interrupt the pipeline processing during the reading/writing of the device information, prohibits the reading of the sequence program until the completion of the reading/writing of the device information when a sequence program to be read/written from/to the first storage unit has been input, and controls to carry out the reading/writing of the device information and the reading of a sequence program simultaneously when a sequence program to be read/written from/to the second storage unit has been input.

2. The programmable controller according to claim 1, wherein the pipeline register is a register that collectively stores data of one sequence program when all of this data has been read from the first storage unit, and the control unit controls not to execute the reading/writing of the device information from/to the first storage unit until when the reading of the data of the one sequence program has been completed.

3. The programmable controller according to claim 1, further comprising a third storage unit that stores a bit that indicates execution/non-execution of an instruction in the last scan, together with the sequence programs.

4. The programmable controller according to claim 1, wherein upon input of an instruction to execute the reading/writing of the device information, the control unit controls to execute the reading/writing of the device information from/to the first storage unit or the second storage unit when an execution condition has been established based on ON/OFF of a contact state of a sequence program immediately before, and controls not to execute the reading/writing of the device information from/to the first storage unit or the second storage unit when an execution condition has not been established.

5. The programmable controller according to claim 1, wherein upon input of an instruction to execute the reading/writing of the device information in a scan that a contact state of a sequence program immediately before has changed, the control unit controls to execute the reading/writing of the device information from/to the first storage unit or the second storage unit when an execution condition has been established based on the contact state of the sequence program immediately before and ON/OFF of a bit showing execution/non-execution of an instruction in the last scan, and controls not to execute the reading/writing of the device information from/to the first storage unit or the second storage unit when an execution condition has not been established.

6. The programmable controller according to claim 3, wherein upon input of an instruction to be executed in a scan that a contact state of a sequence program immediately before has changed, the control unit stores the contact state into the third storage unit.

7. The programmable controller according to claim 1, wherein when the microprocessor is to carry out the reading/writing from/to the first storage unit or the second storage unit during the execution of a pipeline processing based on the sequence programs, the control unit controls to stop the pipeline processing and make the microprocessor start the reading/writing from/to the first storage unit or the second storage unit.

8. The programmable controller according to claim 1, wherein at the time of executing a S/W instruction processing, the control unit controls to stop the pipeline processing and make the microprocessor execute the S/W instruction when an execution condition has been established based on a contact state of a sequence program immediately before and ON/OFF of a bit showing execution/non-execution of an instruction in the last scan, and controls the microprocessor not to execute the S/W instruction when an execution condition has not been established.

* * * * *